United States Patent
Han et al.

(10) Patent No.: US 10,395,236 B2
(45) Date of Patent: Aug. 27, 2019

(54) MOBILE TERMINAL AND METHOD FOR CONTROLLING THE SAME

(71) Applicant: LG ELECTRONICS INC., Seoul (KR)

(72) Inventors: Dongsu Han, Seoul (KR); Hyunjin Kim, Seoul (KR); Hyewon Song, Seoul (KR); Boram Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 594 days.

(21) Appl. No.: 15/130,468

(22) Filed: Apr. 15, 2016

(65) Prior Publication Data

US 2017/0109727 A1 Apr. 20, 2017

(30) Foreign Application Priority Data

Oct. 20, 2015 (KR) ........................ 10-2015-0145909

(51) Int. Cl.
*H04W 4/60* (2018.01)
*G06Q 20/32* (2012.01)
(Continued)

(52) U.S. Cl.
CPC ..... *G06Q 20/3227* (2013.01); *G06Q 20/3674* (2013.01); *G06Q 20/40145* (2013.01);
(Continued)

(58) Field of Classification Search
USPC ......................................... 705/41
See application file for complete search history.

(56) References Cited

U.S. PATENT DOCUMENTS 8,639,291 B1 * 1/2014 Gailloux ........... H04W 52/0274
455/558
9,390,413 B2 * 7/2016 Castell ................. G06Q 20/105
(Continued)

FOREIGN PATENT DOCUMENTS

| KR | 20130138659 | 12/2013 |
| KR | 20140018044 | 2/2014 |
| KR | 20140026263 | 3/2014 |

OTHER PUBLICATIONS

PCT International Application No. PCT/KR2016/010079, International Search Report dated Jan. 6, 2017, 10 pages.
(Continued)

*Primary Examiner* — William E Rankins
(74) *Attorney, Agent, or Firm* — Lee, Hong, DeGerman, Kang & Waimey PC

(57) ABSTRACT

A mobile terminal and a method for controlling the same are disclosed. The mobile terminal includes a display unit and a controller configured to execute a specific application related to a payment, change to a payment ready state and display a payment card in a center area of the display unit when selecting the payment card among cards stored in the specific application, produce one-time payment information, a token value, and perform the payment when receiving a first input in the payment ready state, and change to a payment waiting state and control the display unit so that a display of the payment card is changed to a display of a specific indicator, when receiving a second input in the payment ready state.

19 Claims, 24 Drawing Sheets

(51) Int. Cl.
*G06Q 20/36* (2012.01)
*G06Q 20/40* (2012.01)
H04W 12/06 (2009.01)
H04L 29/06 (2006.01)

(52) U.S. Cl.
CPC ........... *H04W 4/60* (2018.02); *H04L 63/0861* (2013.01); *H04W 12/06* (2013.01)

(56) References Cited

U.S. PATENT DOCUMENTS

| | | | | |
|---|---|---|---|---|
| 2014/0047331 A1* | 2/2014 | Feldman | ................ | H04L 67/10 715/273 |
| 2014/0222670 A1* | 8/2014 | Concannon | ........ | G06Q 20/3278 705/41 |
| 2015/0058146 A1* | 2/2015 | Gaddam | ............. | G06Q 20/322 705/21 |
| 2015/0112871 A1* | 4/2015 | Kumnick | ............. | G06Q 20/382 705/67 |
| 2015/0242844 A1* | 8/2015 | Yisraelian | .............. | G06Q 20/12 705/41 |
| 2015/0310425 A1* | 10/2015 | Cacioppo | ............ | G06Q 20/382 705/64 |
| 2015/0339767 A1* | 11/2015 | Chen | ...................... | G06O 20/08 705/39 |
| 2015/0371234 A1* | 12/2015 | Huang | .................. | G06Q 20/36 705/44 |

OTHER PUBLICATIONS

Korean Intellectual Property Office Application No. 10-2015-0145909, Office Action dated Oct. 26, 2016, 7 pages.

* cited by examiner

MOBILE TERMINAL AND METHOD FOR CONTROLLING THE SAME

CROSS-REFERENCE TO RELATED APPLICATIONS

Pursuant to 35 U.S.C. § 119, this application claims the benefit of earlier filing date and right of priority to Korean Patent Application No. 10-2015-0145909, filed on Oct. 20, 2015, the contents of which are incorporated by reference herein in its entirety.

BACKGROUND OF THE DISCLOSURE

Field of the Disclosure

The present disclosure relates to a mobile terminal performing a payment using card information stored therein and a method for controlling the same.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

The mobile terminal may have a wallet function and thus additionally have a cash charging function, a credit card function, etc. so that a cash payment or a card payment can be performed through the mobile terminal. In particular, the credit card function may previously register card information in the mobile terminal and perform the card payment using the registered card information. For example, the card information registered in the mobile terminal may be transmitted to an affiliated store terminal using near field communication (NFC) technology or magnetic secure transmission (MST) technology, and thus the card payment may be performed.

However, such a card payment method can be performed only when a payment-related application is executed in a foreground. Further, the mobile terminal produces a time information-based token value for security and has to again perform the payment processing from the beginning when the payment is not performed in a set period of time.

SUMMARY OF THE DISCLOSURE

Accordingly, an object of the present invention is to address the above-noted and other problems.

Another object of the present disclosure is to provide a mobile terminal and a method for controlling the same which may execute a specific application related to a payment, change to a payment ready state and display a payment card in a center area of a display unit when selecting the payment card among cards stored in the specific application, produce one-time payment information, a token value, to perform the payment when receiving a first input in the payment ready state, and change to a payment waiting state and change a display of the payment card to a display of a specific indicator when receiving a second input in the payment ready state.

Another aspect of the present disclosure is to provide a mobile terminal and a method for controlling the same which may execute a specific application related to a payment, select a payment card among cards stored in the specific application and change to a token value production waiting state when receiving authentication information and a first input, and produce one-time payment information, a token value, when receiving a second input in the token value production waiting state.

In one aspect, there is a mobile terminal comprising a display unit and a controller configured to execute a specific application related to a payment, change to a payment ready state and display a payment card in a center area of the display unit when selecting the payment card among cards stored in the specific application, produce one-time payment information, a token value, and perform the payment when receiving a first input in the payment ready state, and change to a payment waiting state and control the display unit so that a display of the payment card is changed to a display of a specific indicator, when receiving a second input in the payment ready state.

In another aspect, there is a mobile terminal comprising a display unit, a fingerprint recognition unit, and a controller configured to execute a specific application related to a payment, select a payment card among cards stored in the specific application, change to a token value production waiting state when receiving authentication information and a first input through the display unit or the fingerprint recognition unit, and produce one-time payment information, a token value, when receiving a second input in the token value production waiting state.

In another aspect, there is a method for controlling a mobile terminal comprising executing a specific application related to a payment, when selecting a payment card among cards stored in the specific application, changing to a payment ready state and displaying the payment card in a center area of a display unit, when receiving a first input in the payment ready state, producing one-time payment information, a token value, to perform the payment, and when receiving a second input in the payment ready state, changing to a payment waiting state and changing a display of the payment card to a display of a specific indicator.

In another aspect, there is a method for controlling a mobile terminal comprising executing a specific application related to a payment, when selecting a payment card among cards stored in the specific application and receiving authentication information and a first input, changing to a token value production waiting state, and when receiving a second input in the token value production waiting state, producing one-time payment information, a token value.

Effects of the mobile terminal and the method for controlling the same according to embodiments of the invention are described below.

According to at least one of the embodiments of the invention, the embodiment of the invention can differentiate the payment ready state from the payment waiting state and immediately perform the payment during the execution of other application in the payment waiting state.

According to at least one of the embodiments of the invention, the embodiment of the invention can differentiate a fingerprint input time point from a token value production time point and extend the token value production time point. Further, the embodiment of the invention can update the token value before a valid time of the token value is ended, and thus can extend a payment time point while maintaining security.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
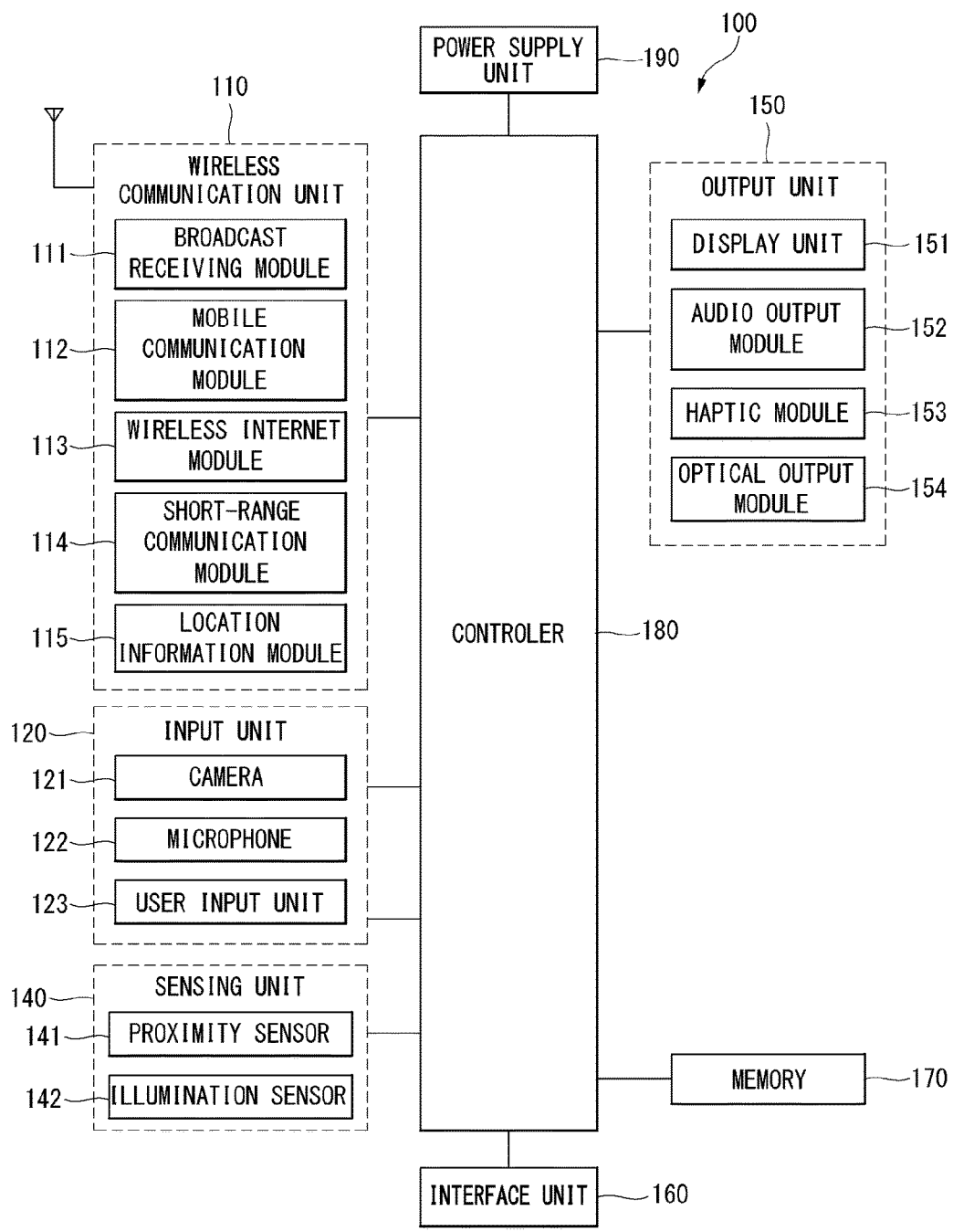
FIG. 1A is a block diagram of a mobile terminal in accordance with the present disclosure.
Figure 1B:
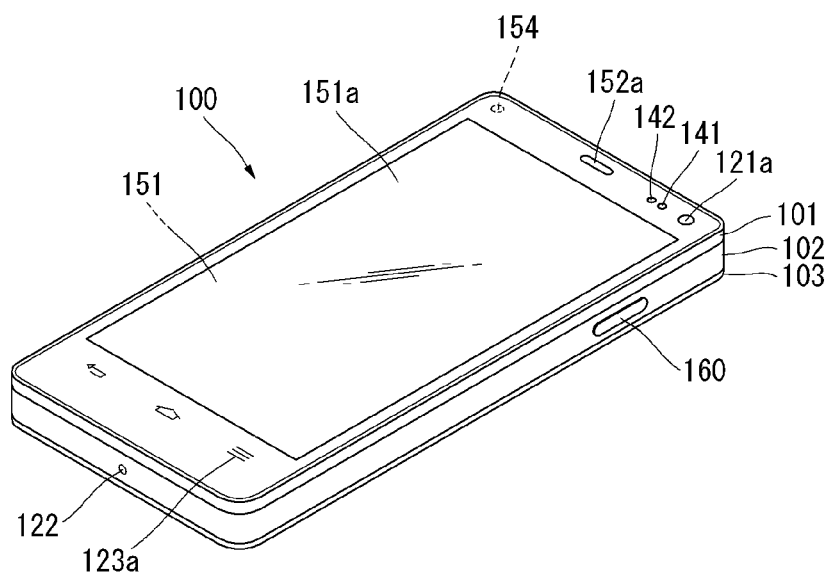
FIGS. 1B and 1C are conceptual views of one example of the mobile terminal, viewed from different directions.
Figure 1C:
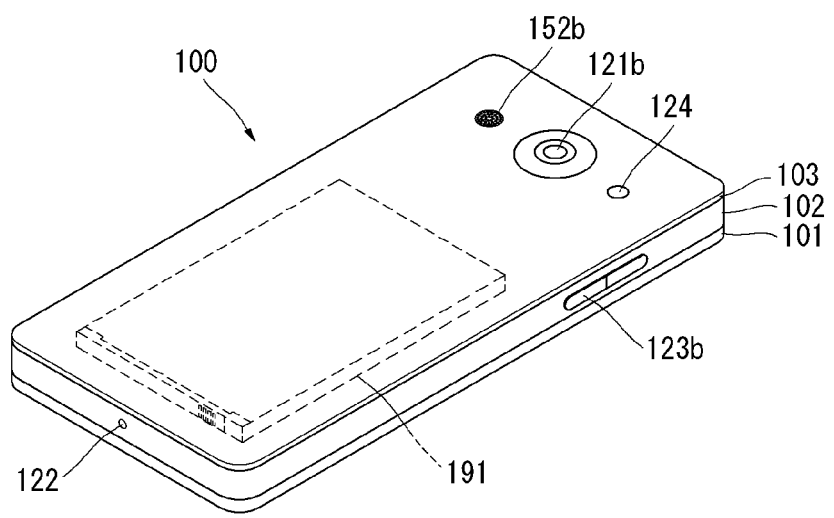

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution- Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input.

Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera". When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Bluetooth is a short-range wireless standard technology used to wirelessly operate a keyboard, a mouse, a headphone, a healthcare equipment, etc. As upgraded versions of Bluetooth have been continuously announced for a long period of time, specifications of Bluetooth have been gradually upgraded. The latest version of Bluetooth is Bluetooth 4.0 version. Bluetooth 4.0 version additionally provides a specification of Bluetooth Low Energy (hereinafter, referred to as "BLE") and can reduce power consumption by supporting only lower performances. BLE is also called Bluetooth Smart or Bluetooth Smart Ready. A difference between Bluetooth Smart and Bluetooth Smart Ready is as follows. Bluetooth Smart supports only low energy, and Bluetooth Smart Ready supports all of the existing specifications. Because BLE is different from the existing Bluetooth, iOS7 additionally provided library of Core Bluetooth and provides a BLE support function to reference Bluetooth library from Android 4.3, so as to use BLE. A method for using BLE may set an operation of BLE and obtain ADMIN authority so as to search and pair devices using the same method as a method for obtaining authority of Bluetooth. The function of BLE may be used to communicate with small-sized devices (for example, wearable devices, sensors, etc.) or used for Bluetooth covering a near field communication (NFC) function through in various methods.

iBeacon is a short-range communication technology for an indoor positioning system developed by Apple and is a new type wave transmitting device of low power and low cost capable of notifying iOS7 devices of their location. The technology enables smart phones, tablets, and other devices to perform actions when in close proximity to an iBeacon. One application example of iBeacon is to help smart phones determine their approximate location or context. With the help of iBeacon, smart phone's software can approximately find its relative location to iBeacon installed in a store. Brick and motor retail stores use the beacons for mobile commerce, offering customers special details through mobile marketing, and can enable mobile payments through point of sale systems. The iBeacon technology may be implemented using Bluetooth low energy (BLE) technology and is called Bluetooth smart. iBeacon uses Bluetooth low energy proximity sensing to transmit a universally unique identifier picked up by a compatible app or operating system. The identifier and several bytes sent with it can be used to determine the device's physical location, track customers, or trigger a location-based action on the device such as a check-in on social media or a push notification. iBeacon compatible transmitters come in a variety of form factors, including small coin cell devices, USB sticks, and generic Bluetooth 4.0 capable USB dongles.

Magnetic Secure Transmission (MST) is a communication technology transmitting specific data using a magnetic signal. The MST may be used to transmit authentication information to a payment terminal in a payment stage. More specifically, the MST is a communication technology generating a magnetic signal and transmitting the magnetic signal to a payment terminal, so as to obtain the same effect as an effect obtained by swiping a magnetic card to a payment terminal. The MST can generate a magnetic field by attaching an additional device generating the magnetic field to a battery, a case, an accessory, etc. of a user's mobile terminal without attaching a separate technology or a separate device to payment terminals of affiliated stores. Namely, the user additionally buys an equipment having a micro USB port, that is embedded in a battery or used to charge the battery, for the BLE and MST technologies, registers information of a payment card (i.e., his or her credit card) in a payment application, and executes the payment application when he/she performs the payment to select the payment card and to input authentication information. Then, when the user brings his/her mobile terminal into contact with a payment terminal, a magnetic field using the payment card is generated in the mobile terminal and is transmitted to the payment terminal. Hence, the payment may be performed.

Further preferred embodiments of the invention will be described in more detail with reference to additional drawing figures. It is understood by those skilled in the art that the present features can be embodied in several forms without departing from the characteristics thereof.

First to fifth inputs are used to differentiate a plurality of inputs in each embodiment of the invention. For example, the first input in one embodiment may be defined differently from the first input in another embodiment. In the following description, each of the first to fifth inputs is merely an example and may include various types of inputs.

Figure 2:
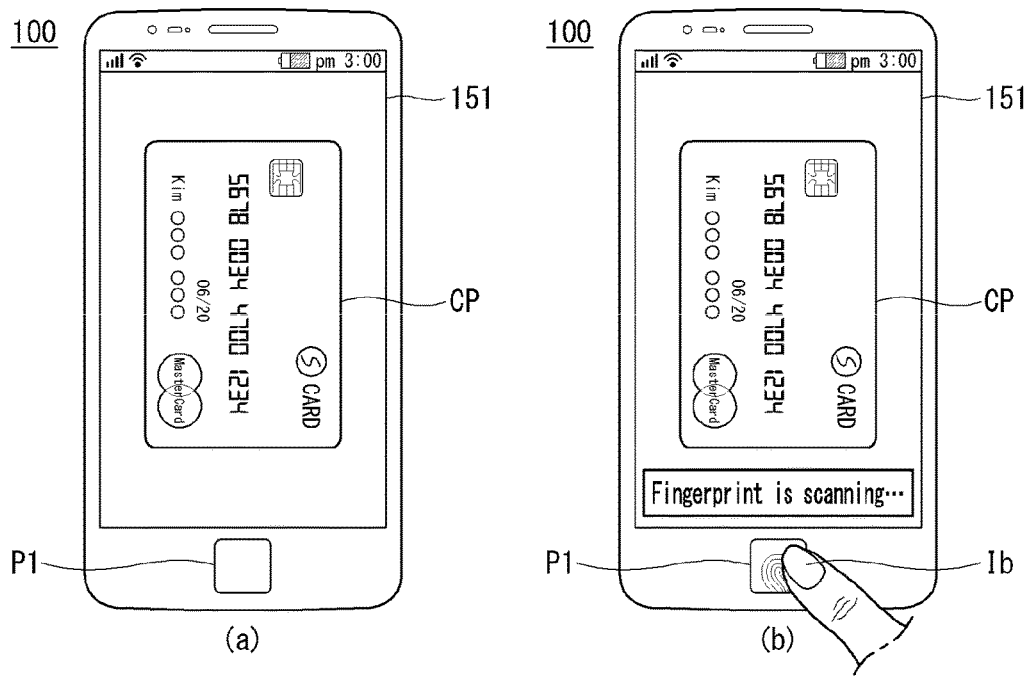
FIG. 2 illustrates a method for generally performing a payment through a mobile terminal.
Figure 2:
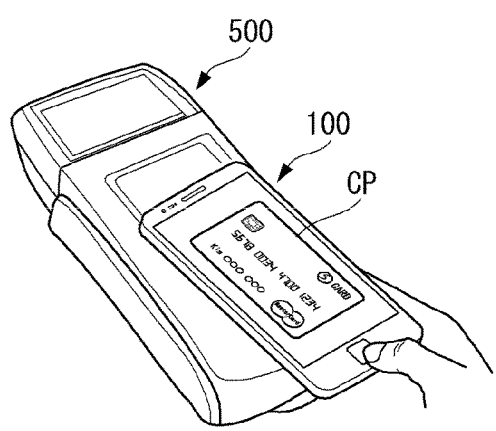
Figure 2:
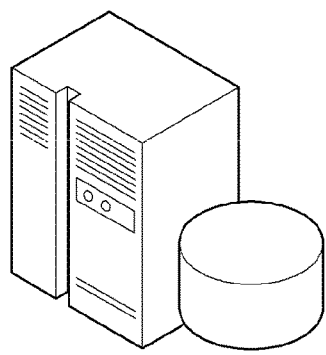

FIG. 2 illustrates a method for generally performing a payment through a mobile terminal.

Referring to FIG. 2, the mobile terminal 100 may execute a specific application related to a payment, select a payment card CP among a plurality of cards stored in the specific application, and display the selected payment card CP on the entire screen of the display unit 151.

When the mobile terminal 100 receives a fingerprint input Ib through a fingerprint recognition unit P1 in a state where the payment card CP is displayed on the entire screen of the display unit 151, the mobile terminal 100 may produce one-time payment information, i.e., a token value. In the instance, the token value includes time information of a time point, at which the fingerprint input Ib is performed, and the token value is valid for 20 seconds from the time point of the fingerprint input Ib. If the mobile terminal 100 tags an affiliated store terminal 500 and transmits the token value to a payment server (shown in (d) of FIG. 2) through the affiliated store terminal 500 in 20 seconds, the payment server may determine the token value to be valid and transmit a payment authorization signal to the affiliated store terminal 500.

However, the payment is generally performed only in a state where the payment card CP is displayed on the entire screen of the display unit 151. Therefore, if other application is being executed, a specific application related to the payment will be again executed after the other application ends due to the payment. Further, when waiting time for payment increases, the user has to again perform the fingerprint authentication because the payment cannot be performed in 20 seconds.

In order to solve the former problem, a first embodiment of the invention proposes a method for differentiating a payment ready state from a payment waiting state and immediately performing the payment even in the payment waiting state. In order to solve the latter problem, a second embodiment of the invention proposes a method for extending a token value production time point.

Figure 3:
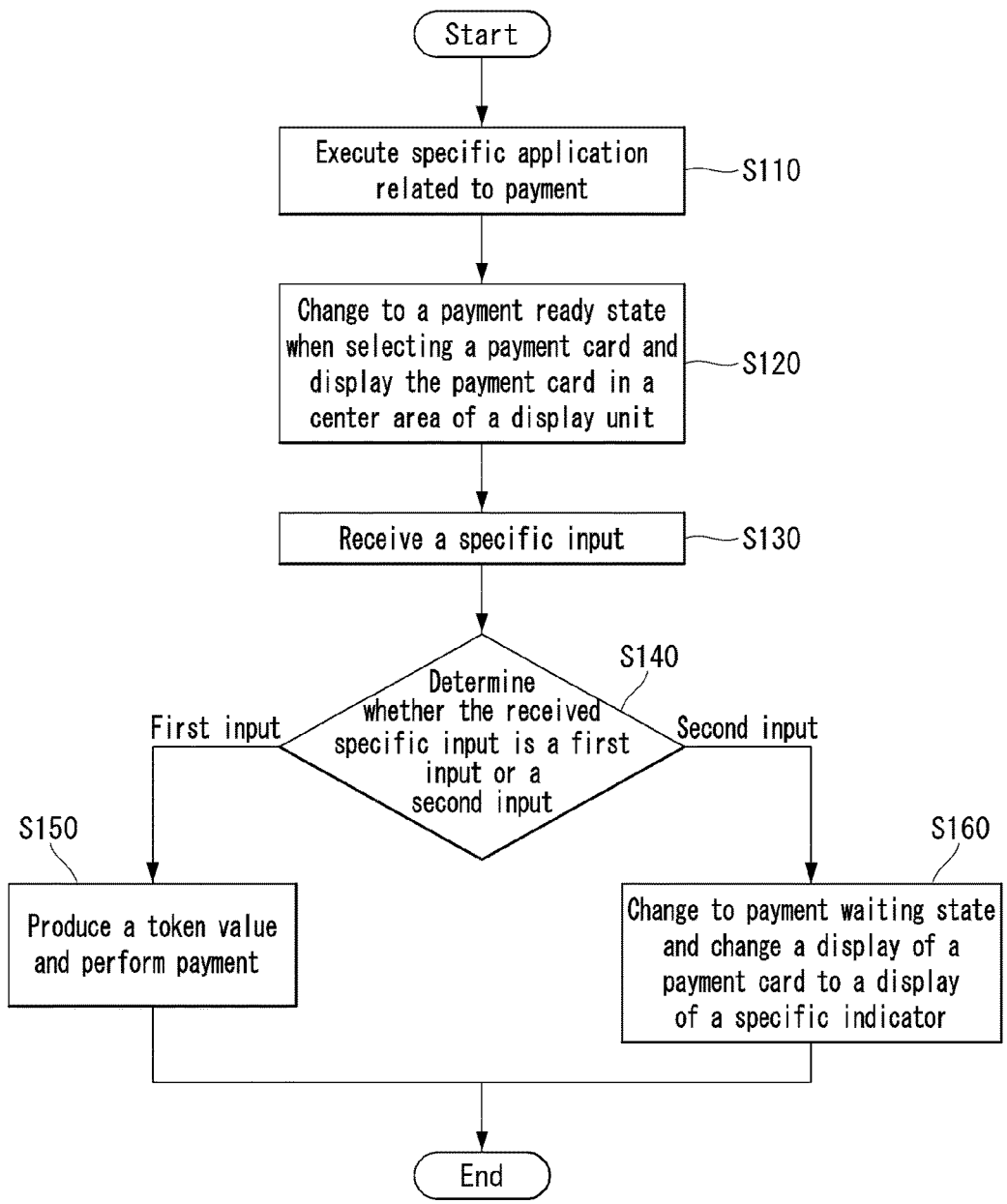
FIGS. 3 and 4 are a flow chart showing a method for controlling a mobile terminal according to a first exemplary embodiment of the invention.
Figure 4:
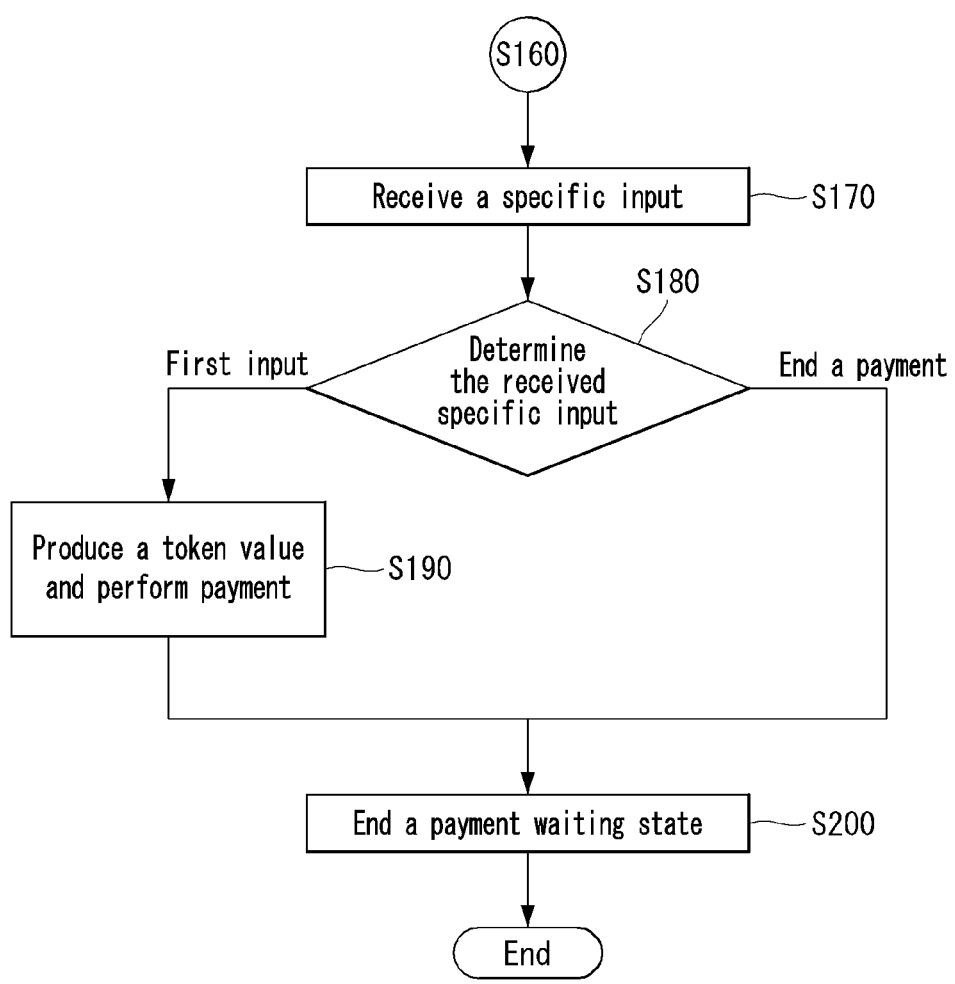

FIGS. 3 and 4 are a flow chart showing a method for controlling a mobile terminal according to a first exemplary embodiment of the invention. FIGS. 5 to 13 illustrate a method for controlling a mobile terminal according to the first exemplary embodiment of the invention.

According to the first embodiment of the invention, an operation mode of the mobile terminal 100 may be divided into a payment ready state and a payment waiting state. As shown in (a) of FIG. 6, the payment ready state indicates a state, in which a specific application for the payment is executed to select a payment card CP and the selected payment card CP is displayed on an entire area of the display unit 151. Namely, in the payment ready state, the specific application is firstly executed earlier than other applications, that are being executed, and only an execution screen of the specific application is displayed on the display unit 151. As shown in (a) of FIG. 9, the payment waiting state indicates a state, in which when a specific input is received in the payment ready state, the specific application related to the payment is executed later than other application, and only a specific indicator corresponding to the payment card is displayed in one area of the display unit 151. Namely, in the payment waiting state, the other application is executed earlier than the specific application. However, the payment waiting state may indicate a state, in which partial information related to the execution of the specific application is displayed in one area of the display unit 151 and the execution order of the applications is changeable so that the specific application is executed earlier than the other application. An execution method, in which the specific application is firstly executed earlier than other application and only the execution screen of the specific application is displayed on the entire screen of the display unit, is defined as a foreground execution for the sake of brevity and ease of reading. Further, an execution method, in which a specific indicator is displayed in one area of the display unit while firstly executing other application, an execution screen of the other application is displayed in other area of the display unit, and the specific application for the payment is temporarily executed earlier than the other application, is defined as a background execution for the sake of brevity and ease of reading.

Referring to FIG. 3, the controller 180 of the mobile terminal may execute a specific application related to the payment in step S110. When the controller 180 selects a payment card among cards stored in the specific application, the controller 180 may change to the payment ready state and display the payment card in a center area of the display unit in step S120.

The controller 180 may execute the specific application related to the payment and may register at least one credit card, at least one point card, etc. in the specific application. More specifically, when the controller 180 inputs information of a specific card through an execution screen of the specific application and receives a card registration request, the controller 180 may transmit the input card information to a server of a card issuer, receive identification information (for example, a replacement card number (token)) and an authentication seed of the payment card, and match and store the card information to a specific card. Hence, the card registration may be completed.

When the controller 180 selects the payment card among the cards stored in the specific application, the controller 180 may change an operation mode of the mobile terminal to the payment ready state. When the operation mode enters into the payment ready state, the controller 180 may display the selected payment card in the center area of the display unit 151. Namely, when the controller 180 selects the payment card, the controller 180 may perform a function related to the payment in the foreground and display the payment card in the center area of the display unit 151. Further, the controller 180 may not display an execution screen of other application during the multitasking.

The controller 180 of the mobile terminal may receive a specific input in the payment ready state in step S130. In the embodiment disclosed herein, the specific input includes a first input for performing the payment in the payment ready state and a second input for changing the operation mode of the mobile terminal from the payment ready state to the payment waiting state. In addition, the specific input may include another input, that causes the payment ready state to end.

The controller 180 of the mobile terminal may determine whether the received specific input is the first input or the second input in step S140. When the controller 180 receives the first input as the result of a determination, the controller 180 may produce one-time payment information, i.e., a token value and perform the payment in step S150.

More specifically, when the controller 180 receives the first input in the payment ready state (i.e., in a state where the payment card is displayed in the center area of the display unit 151), the controller 180 may produce the one-time payment information, the token value, and perform the payment.

The controller 180 may determine to receive the first input in at least one of a case where the controller 180 obtains a fingerprint through the fingerprint recognition unit and succeeds in the fingerprint authentication, a case where the controller 180 inputs a password through the display unit 151 and succeeds in the password authentication, a case where the controller 180 succeeds in the recognition of a registered iris, or a case where the controller 180 senses a registered heartbeat. In the embodiment disclosed herein, the first input may be at least one of a fingerprint input through the fingerprint recognition unit, a password input, the iris recognition through the camera, or the heartbeat sensing through a heartbeat sensor or a PPG sensor.

When the controller 180 receives the first input, the controller 180 may produce the one-time payment information, the token value using a reception time of the first input, identification information corresponding to the payment card, and the authentication seed and transmit the token value to an affiliated store terminal.

The affiliated store terminal may transmit the received token value to the server of the card issuer and determine whether or not the token value is valid. Hence, the affiliated store terminal may approve or may not approve the payment.

When the controller 180 of the mobile terminal receives the second input in the payment ready state as the result of a determination, the controller 180 may change the payment ready state to the payment waiting state and change a display of the payment card to a display of a specific indicator in step S160.

When the controller 180 receives the second input, the controller 180 may change the operation mode of the mobile terminal from the payment ready state to the payment waiting state. In the embodiment disclosed herein, the second input may be at least one of an input for dragging the payment card in a specific direction of the display unit 151, a long touch input or a force touch input with respect to the payment card, a touch or a swipe input with respect to the fingerprint recognition unit, a touch input of a back button key, or a gesture input.

When the controller 180 receives the second input, the controller 180 may change the operation mode of the mobile terminal to the payment waiting state and change the display of the payment card to the display of the specific indicator. In the embodiment disclosed herein, the specific indicator may indicate at least one of a partial image of the payment card, an image having controlled transparency of the payment card, a fingerprint image, a text, or an icon. The specific indicator may be displayed only in the payment waiting state.

Referring to FIG. 4, when the controller 180 of the mobile terminal again receives the specific input in the payment waiting state in step S170, the controller 180 may determine the received specific input in step S180.

When the specific input is the first input, the controller 180 may produce the one-time payment information, the token value, and perform the payment in step S190. When the payment is completed, the controller 180 may end the payment ready state in step S200. When the specific input is a payment end input, the controller 180 may immediately end the payment waiting state.

More specifically, when the controller 180 receives the first input related to a payment request in the payment waiting state, the controller 180 may maintain a state where an execution screen of other application and the specific indicator are displayed and produce the token value, thereby performing the payment. Further, when the controller 180 receives the first input related to the payment request in the payment waiting state, the controller 180 may change a state where an execution screen of other application and the specific indicator are displayed to a state where the payment card is displayed on the execution screen of other application (i.e., the controller 180 may change the payment waiting state to the payment ready state). Then, the controller 180 may produce the token value and perform the payment. In this instance, the controller 180 may ends the payment waiting state when the payment is completed.

When the controller 180 receives the payment end input in the payment waiting state, the controller 180 may end the payment waiting state without performing the payment. In the embodiment disclosed herein, the payment end input may be one of an input of a location change exceeding a set range and an input for ending the specific application related to the payment.

When the controller 180 changes a state of the display unit 151 in the payment ready state or the payment waiting state to an inactive state, the controller 180 may maintain a display of the specific indicator and control the display unit 151 so that power of another area of the display unit 151 is turned off. Namely, the controller 180 may control the display unit 151 so that the display unit 151 continuously displays the payment card or the specific application even when the display unit 151 is inactivated. In the embodiment disclosed herein, the inactive state of the display unit 151 may include an off-state of the display unit 151, a state where power of the display unit 151 is turned off, and a state where the display unit 151 is changed to a lock screen state.

The controller 180 may change a display of at least one of the payment card, a background screen of the payment card, the specific indicator, or a background screen of the specific indicator in the payment ready state or the payment waiting state depending on whether or not authentication information is input, whether or not the token value is produced, and valid time of the token value. Further, the controller 180 may differently set a display of the payment card or a display of the background screen of the payment card or differently set a display of the specific indicator or a display of the background screen of the specific indicator depending on whether or not the authentication information is input, whether or not the token value is produced, and the valid time of the token value. Thus, the user may determine whether or not the authentication information is input, whether or not the token value is produced, and whether or not the valid time of the token value is close to its end time point depending on a display state of the payment card or a display state of the background screen of the payment card and a display state of the specific indicator or a display state of the background screen of the specific indicator.

When the controller 180 receives a third input in the payment waiting state, the controller 180 may execute the specific application in the background and immediately perform the payment without changing the operation mode (namely, in a state where the specific indicator is displayed in one area of the display unit 151). Further, when the controller 180 receives a fourth input in the payment waiting state, the controller 180 may perform the payment after changing the operation mode to the payment ready state (namely, after displaying the payment card on the entire area of the display unit 151).

When the controller 180 receives a fifth input in the payment ready state, the controller 180 may further display coupons or point cards. In the embodiment disclosed herein, the fifth input may include an input which touches a specific coupon or a specific point card and drags it on the payment card. When a specific coupon or a specific point card is selected among the coupons or the point cards, the controller 180 may overlappingly display the selected specific coupon or the selected specific point card on the payment card.

When the controller 180 receives the first input in a state where the specific coupon or the specific point card is overlappingly displayed on the payment card, the controller 180 may perform the payment using the specific coupon, the specific point card, or the payment card.

Figure 5:
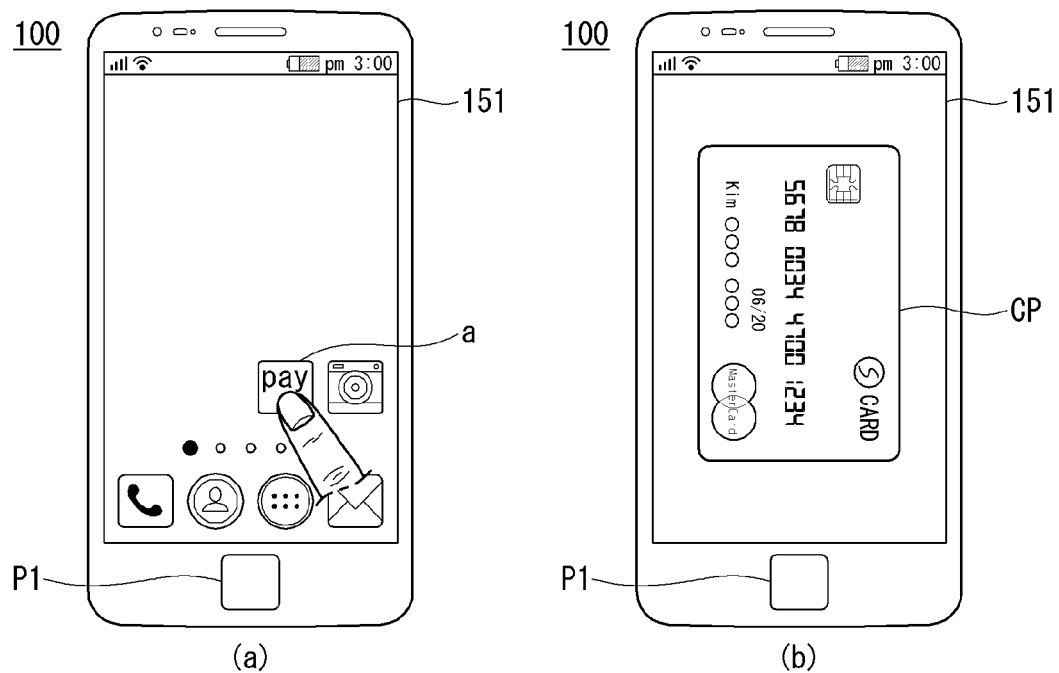
FIGS. 5 to 13 illustrate a method for controlling a mobile terminal according to a first exemplary embodiment of the invention.

Referring to FIG. 5, the controller 180 of the mobile terminal may execute the specific application through a touch input with respect to an icon 'a' indicating the specific application related to the payment, select the payment card CP, and display the payment card CP in the center area of the display unit 151.

More specifically, when the controller 180 receives the touch input with respect to the icon 'a' indicating the specific application, the controller 180 may execute the specific application in the foreground. Namely, the controller 180 may firstly execute the specific application earlier than other application and display an execution screen of the specific application on the entire area of the display unit 151.

The controller 180 may select the payment card CP among a plurality of cards stored in the payment application and display the selected payment card CP on an execution screen. In this instance, the controller 180 may change the selected payment card CP through a left or right drag input with respect to the plurality of cards.

Figure 6:
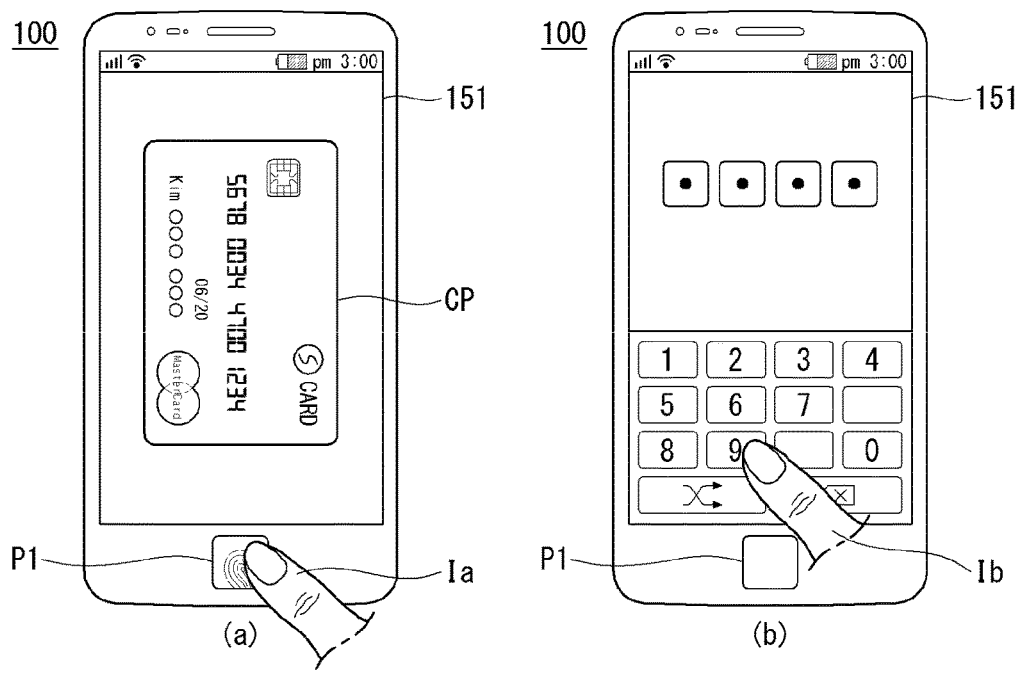
Figure 6:
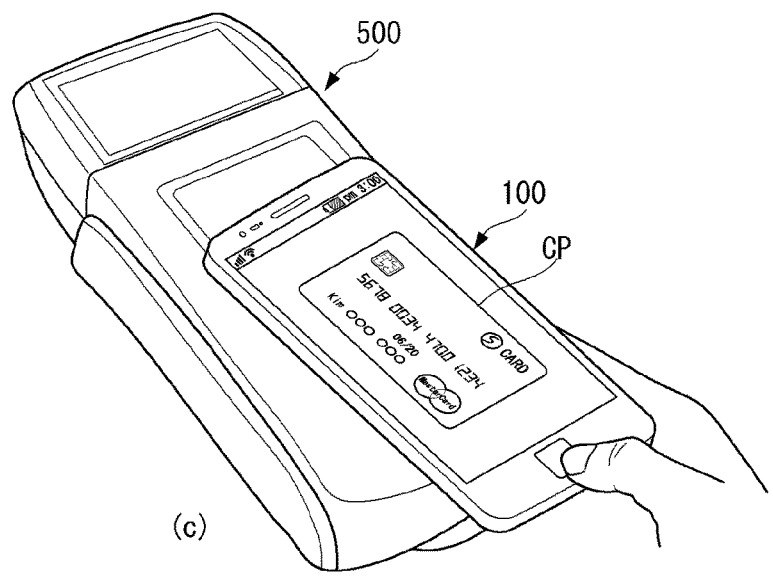

FIG. 6 illustrates a method for performing the payment in an operation mode of the payment ready state in the mobile terminal according to the first embodiment of the invention.

Referring to FIG. 6, when the controller 180 of the mobile terminal changes an operation mode of the mobile terminal to the payment ready state, displays the selected payment card CP on an execution screen of the specific application, and receives a first input, the controller 180 may pass an authentication process and then perform the payment. In the embodiment disclosed herein, the first input may be at least one of a fingerprint input through the fingerprint recognition unit, a password input through the display unit 151, the iris recognition, or the heartbeat sensing.

More specifically, the controller 180 may execute the specific application, select the payment card CP among cards stored in the specific application, and set the operation mode of the mobile terminal to the payment ready state. In the payment ready state, the controller 180 may display the selected payment card CP in the center area of the display unit 151. When the controller 180 receives a touch input Ia through the fingerprint recognition unit P1 in a state where the payment card CP is displayed in the center area of the display unit 151, the controller 180 may obtain a fingerprint to perform authentication. Alternatively, when the controller 180 receives a touch input Ib pressing a password through the display unit 151, the controller 180 may perform authentication using the input password. When the obtained fingerprint or the input password is identical with an authentication value stored in the controller 180, the controller 180 may produce the one-time payment information, i.e., the token value.

The controller 180 may transmit the token value, which is produced by tagging the mobile terminal 100 to the affiliated store terminal 500, to the affiliated store terminal 500 and perform the payment. In the embodiment disclosed herein, the affiliated store terminal 500 may transmit the token value including time information, identification information corresponding to the payment card, and an authentication seed to the server of the card issuer and determine whether or not the token value is valid, thereby deciding the payment authorization or the payment failure.

Figure 7:
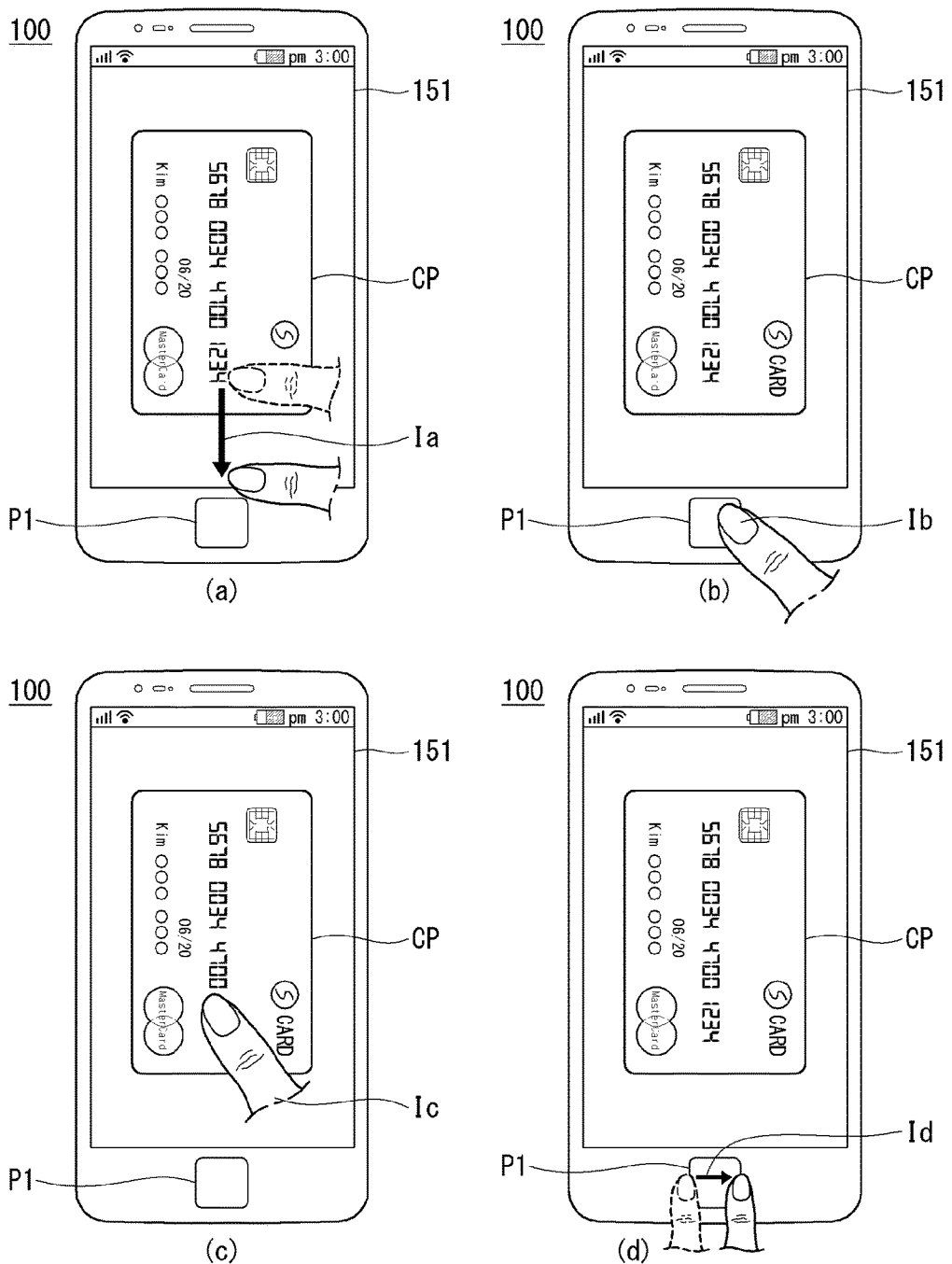
Figure 8:
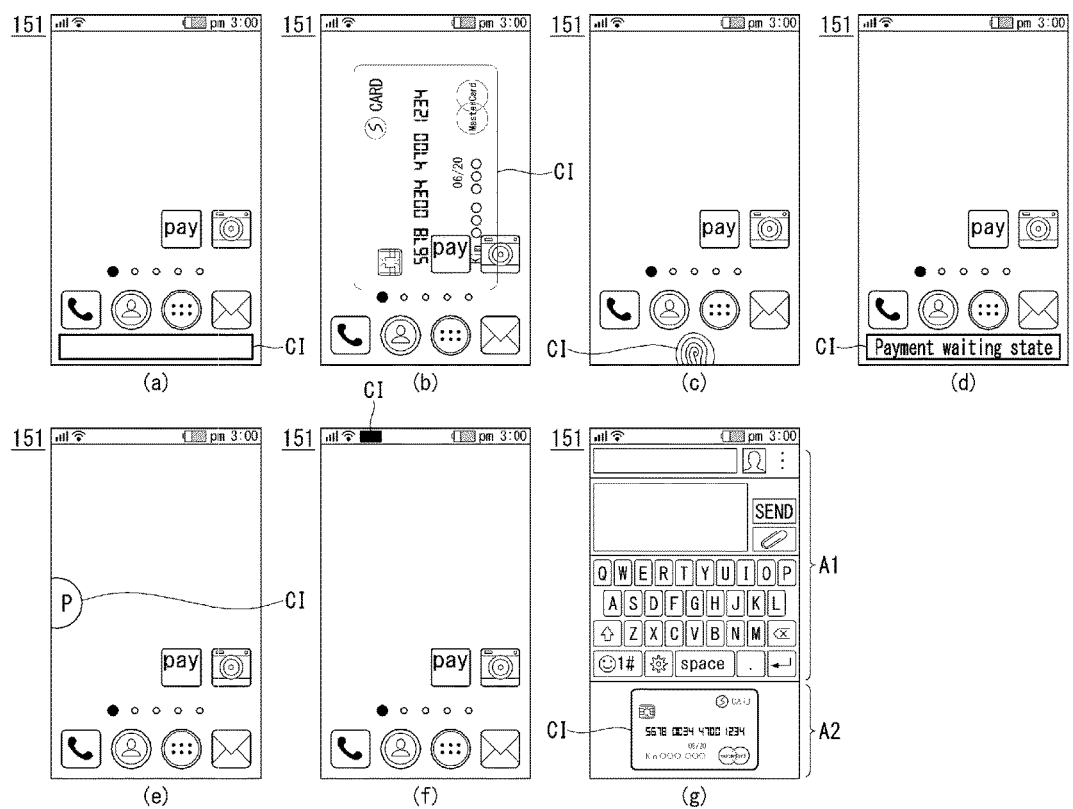

FIGS. 7 and 8 illustrate a change to the payment waiting state of the operation mode and a change of a display of the payment card in the payment waiting state in the mobile terminal according to the first embodiment of the invention.

Referring to FIGS. 7 and 8, when the controller 180 of the mobile terminal receives second inputs Ia to Id in the payment ready state, the controller 180 may change the operation mode of the mobile terminal to the payment waiting state and change a display of the payment card CP to a display of a specific indicator CI. In the embodiment disclosed herein, the second input may be at least one of an input for dragging the payment card in a specific direction of the display unit, a long touch input or a force touch input with respect to the payment card, and a touch or a swipe input with respect to the fingerprint recognition unit.

Referring to FIG. 7, when the controller 180 receives the second input, the controller 180 may change the operation mode from the payment ready state to the payment waiting state.

More specifically, as shown in (a) and (c) of FIG. 7, when the controller 180 receives an input Ia for dragging the payment card CP displayed in the center area of the display unit 151 in a downward direction of the display unit 151 or a long touch input Ic with respect to the payment card CP, the controller 180 may change the operation mode from the payment ready state to the payment waiting state. Further, as shown in (b) and (d) of FIG. 7, when the controller 180 receives a touch input Ib or a drag input Id with respect to the fingerprint recognition unit P1 in a state where the payment card CP is displayed in the center area of the display unit 151, the controller 180 may change the operation mode from the payment ready state to the payment waiting state.

Referring to FIG. 8, when the controller 180 changes the operation mode of the mobile terminal to the payment waiting state in response to the second input, the controller 180 may change a display of the payment card CP to a display of a specific indicator CI.

More specifically, as shown in (a) of FIG. 8, when the controller 180 receives the second input (for example, a drag input in a specific direction) with respect to the payment card CP, the controller 180 may change a display of the payment card CP, of which an image is entirely displayed in the center area of the display unit 151, to a display of a partial image CI in a first area of the display unit 151. In the embodiment disclosed herein, the first area of the display unit 151 may be an edge area of the display unit 151 corresponding to a direction of the drag input.

As shown in (b), (e), and (0 of FIG. 8, when the controller 180 receives the second input (for example the long touch input or the force touch input) with respect to the payment card CP, the controller 180 may change the display of the payment card CP to a display of a transparent payment card CI or a display of a specific icon. In the embodiment disclosed herein, the specific icon may be displayed in a predetermined area of a home screen, a predetermined area of an execution screen of other application, or an indicator area, or may be displayed as a fleeting icon used based on a display of contents. For example, the controller 180 may determine a display location of a fleeting icon CI with reference to a disposition of contents displayed on the display unit 151 and change a location of the fleeting icon CI through a drag input with respect to the fleeting icon CI.

As shown in (c) and (d) of FIG. 8, when the controller 180 receives the second input with respect to the payment card CP, the controller 180 may change the display of the payment card CP to a display of a text set in the first area of the display unit 151 or a display of the fingerprint in the first area.

As shown in (g) of FIG. 8, when the controller 180 receives the second input with respect to the payment card CP, the controller 180 may perform a change so that an area of the display unit 151 is divided and a payment card image CI is zoomed out and displayed in one area A2 of divided areas.

Figure 9:
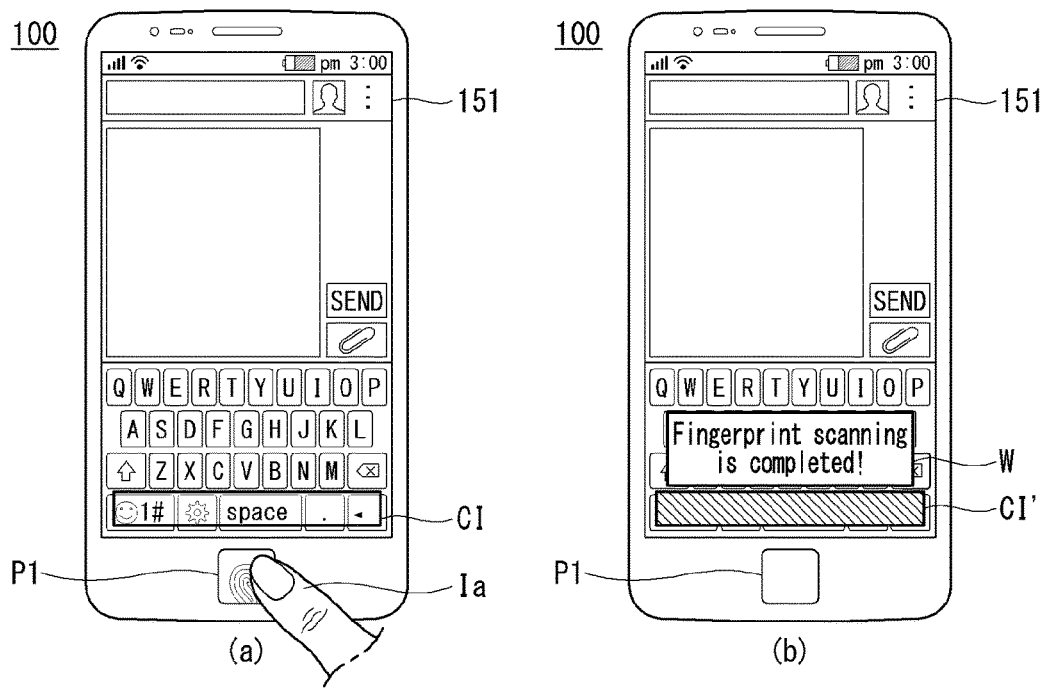
Figure 9:
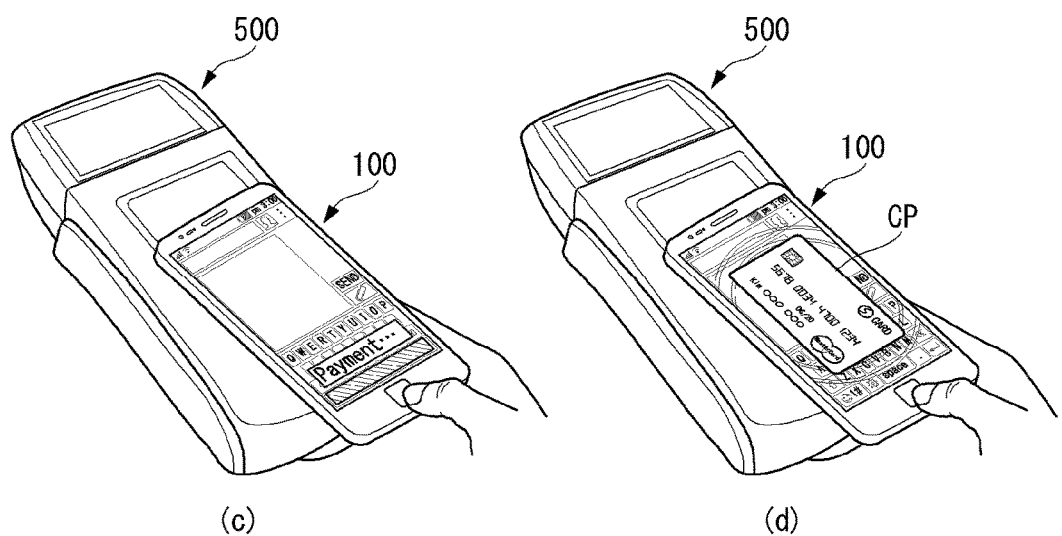

FIG. 9 illustrates a method for displaying the payment ready state during the execution of other application and performing the payment in the payment waiting state in the mobile terminal according to the first embodiment of the invention.

Referring to FIG. 9, the controller 180 of the mobile terminal may complete the authentication in the payment waiting state, in which a specific indicator is displayed on the display unit 151 while firstly executing other application, and then perform the payment.

When the controller 180 executes other application in the payment waiting state, the controller 180 may change an execution of a specific application related to the payment to the background execution and execute the other application. In this instance, the controller 180 may display an execution screen of the other application on the entire area of the display unit 151 and overlappingly display a specific indicator CI in the first area of the display unit 151.

When the controller 180 obtains a fingerprint through the fingerprint recognition unit P1 during the execution of the other application and succeeds in fingerprint authentication, the controller 180 may produce the one-time payment information, i.e., the token value and tag the mobile terminal 100 to the affiliated store terminal 500, thereby performing the payment.

For example, as shown in (a) of FIG. 9, when the controller 180 executes a message application in the payment waiting state, the controller 180 may change the execution of the specific application related to the payment to the background execution and firstly execute the message application earlier than the specific application. When the specific application related to the payment is executed in the background (i.e., when other application is firstly executed earlier than the specific application), the controller 180 may overlapping display a specific indicator CI on an execution screen of the message application. When the controller 180 receives a first input Ia through the fingerprint recognition unit P1 during the execution of the message application, the controller 180 may perform the fingerprint authentication. As shown in (b) of FIG. 9, when the fingerprint authentication is completed, the controller 180 may display a result of the fingerprint authentication on a popup window W. Further, when the fingerprint authentication is completed, the controller 180 may produce the token value and change a display of the specific indicator from CI to CI', which indicates that the token value is completed. When the mobile terminal 100 is tagged to the affiliated store terminal 500, the controller 180 may transmit the token value to the affiliated store terminal 500. In this instance, the controller 180 may produce the one-time payment information, the token value, using a reception time of the first input, identification information corresponding to the payment card, and the authentication seed. Further, as shown in (c) of FIG. 9, the controller 180 may transmit the token value to the affiliated store terminal 500 and display a popup window, which states that the payment is being performed. Alternatively, as shown in (d) of FIG. 9, the controller 180 may automatically change a display of the specific indicator to a display of the payment card CP, display a ring around the payment card CP, and state that the payment is being performed.

Although not shown, the controller 180 of the mobile terminal may temporarily change the payment waiting state to the payment ready state and then perform the payment through the authentication.

When the controller 180 executes other application in the payment waiting state, the controller 180 may change an execution of a specific application related to the payment to the background execution and change an execution of the other application to the foreground execution. In this instance, the controller 180 may display an execution screen of the other application on the entire area of the display unit 151 and overlappingly display a specific indicator in the first area of the display unit 151.

When the controller 180 receives an input for dragging the specific indicator displayed on the execution screen of the other application in the center area of the display unit 151, the controller 180 may temporarily change the payment waiting state to the payment ready state. When the payment waiting state is temporarily changed to the payment ready state, the controller 180 may display the payment card on the execution screen of the other application. When the controller 180 obtains a fingerprint through the fingerprint recognition unit P1 in a state where the payment card is overlappingly displayed on the execution screen of the other application, and succeeds in fingerprint authentication, the controller 180 may produce the one-time payment information, the token value, and tag the mobile terminal 100 to the affiliated store terminal 500, thereby performing the payment. When the fingerprint authentication succeeds, the controller 180 may display the popup window W that states whether or not the fingerprint authentication is completed.

The process for performing the fingerprint authentication and the process for transmitting the token value may be performed sequentially or simultaneously.

Figure 10:
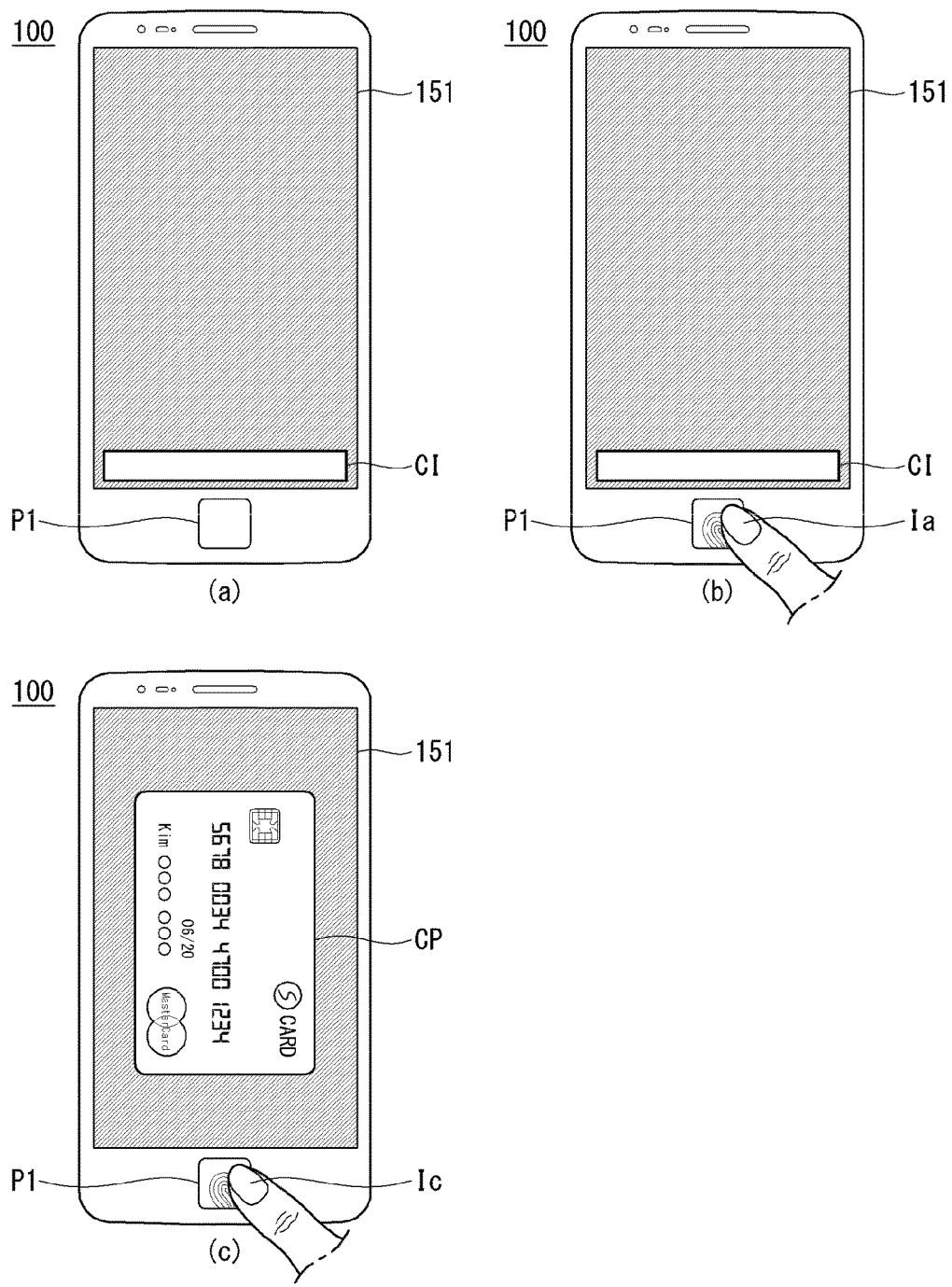

FIG. 10 illustrates a payment method when the display unit is changed to an inactive state in the payment waiting state in the mobile terminal according to the first embodiment of the invention.

Referring to FIG. 10, the controller 180 of the mobile terminal may maintain only a display of a specific indicator CI for a set period of time when the display unit 151 is changed to an inactive state in the payment ready state or the payment waiting state. Namely, power of other area of the display unit 151 except a display area of the specific indicator CI may be turned off.

After the set period of time passed, the controller 180 may release the display of the specific indicator CI and turn off power of the entire area of the display unit 151. When the controller 180 receives a fingerprint input Ia through the fingerprint recognition unit P1 in the inactive state of the display unit 151, the controller 180 may again display the specific indicator CI on the display unit 151 and display the payment waiting state. When the controller 180 receives a fingerprint input Ic for a period of time equal to or longer than the set period of time, the controller 180 may display the payment card CP on the display unit 151 and display that the payment is being performed. In this instance, the controller 180 may turn on only an area of the display unit 151 corresponding to the specific indicator CI or the payment card CP and maintain other area of the display unit 151 in a turn-off state. Alternatively, the controller 180 may turn on the display unit 151 so that a turn-on brightness of the display unit 151 is relatively dark, and then may display the specific indicator CI or the payment card CP on the display unit 151. Namely, the controller 180 may immediately perform the payment in the payment waiting state in the inactive state of the display unit 151.

Figure 11:
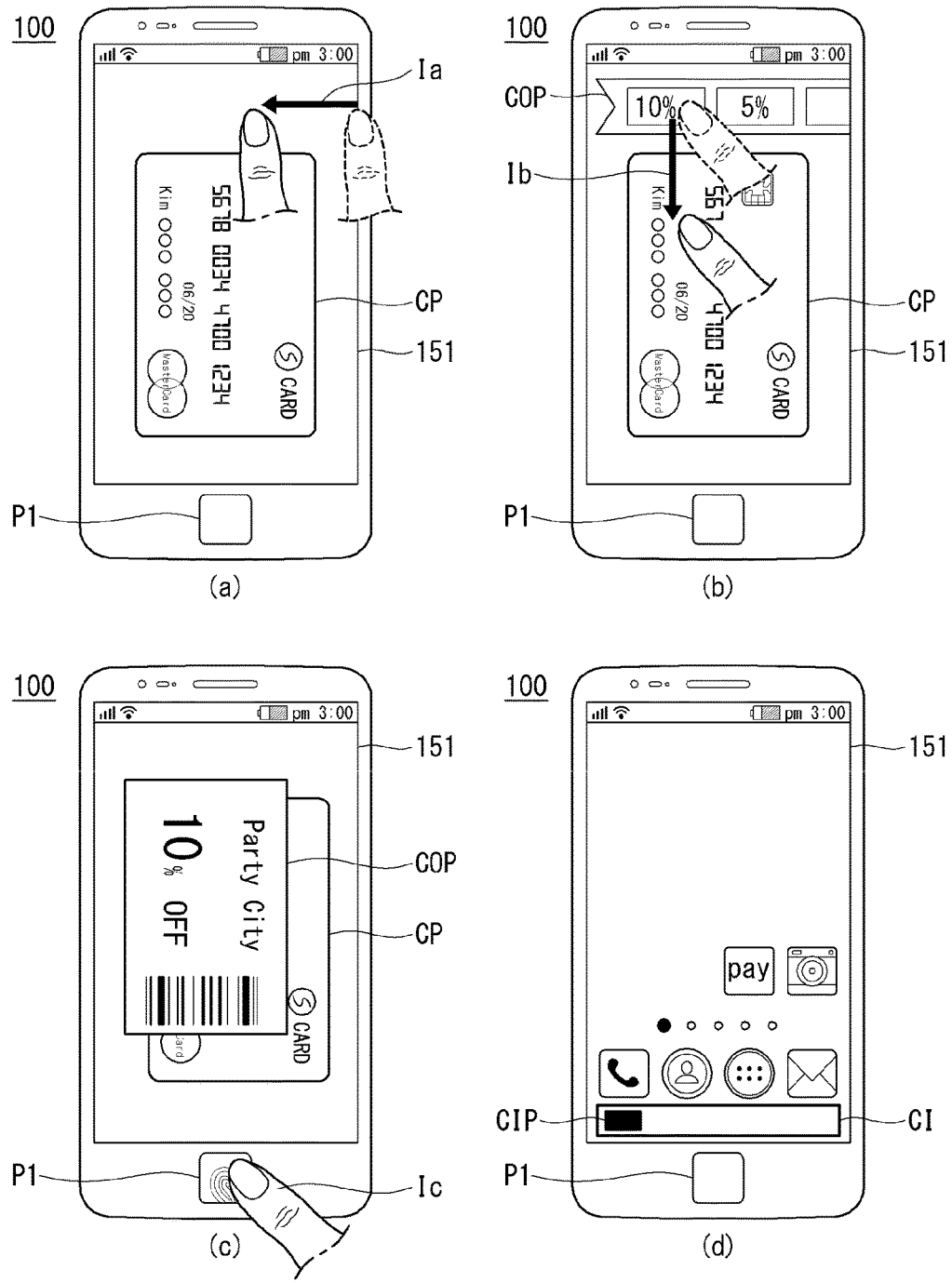

FIG. 11 illustrates a method for performing the payment using a coupon or a point card in the mobile terminal according to the first embodiment of the invention.

Referring to (a) of FIG. 11, the controller 180 of the mobile terminal may display coupons or point cards stored in the specific application in a second area of the display unit 151 through a drag input Ia with respect to the second area of the display unit 151 in a state where the payment card CP is displayed in the center area of the display unit 151.

Next, referring to (b) and (c) of FIG. 11, when the controller 180 receives an input Ib that selects a specific coupon or a specific point card among the coupons or the point cards displayed in the second area of the display unit 151 and swipes the specific coupon or the specific point card to the payment card CP, the controller 180 may overlapping display the selected specific coupon or the selected specific point card on the payment card CP. In this instance, when a plurality of coupons or a plurality of point cards are selected, the controller 180 may stack and display the plurality of coupons or the plurality of point cards on the payment card CP and also transparently display them, so that lower parts of the plurality of coupons or the plurality of point cards are seen.

Referring to (d) of FIG. 11, when the controller 180 selects the payment card CP, the specific point card or the specific coupon COP and then changes the operation mode from the payment ready state to the payment waiting state, the controller 180 may overlapping display a specific point indicator or a specific coupon indicator CIP indicating the specific point card or the specific coupon COP on the specific indicator CI.

Figure 12:
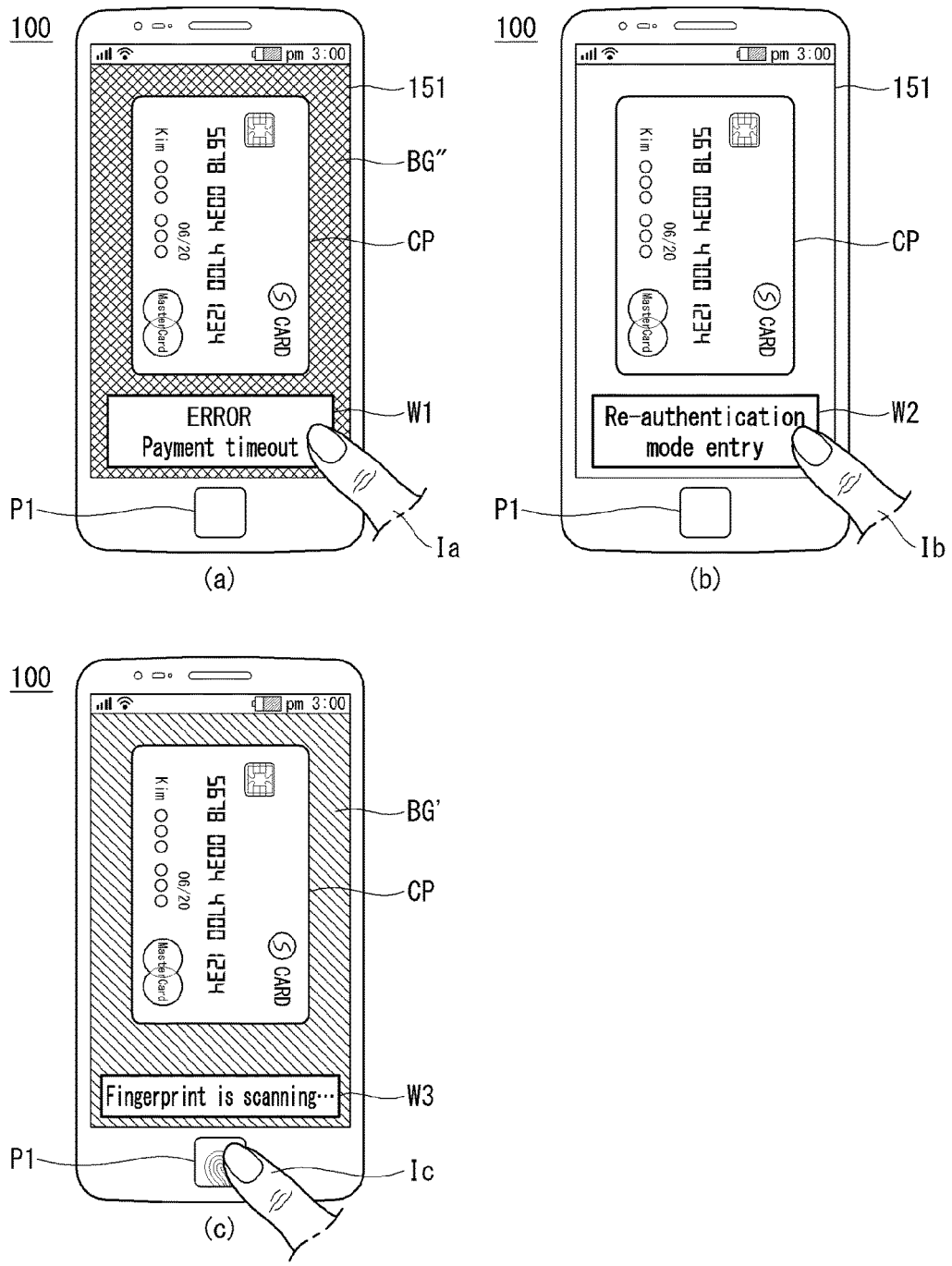

FIG. 12 illustrates a method for performing re-authentication when a payment error is generated in the mobile terminal according to the first embodiment of the invention.

Referring to FIG. 12, when an error is generated during the payment process, the controller 180 of the mobile terminal may display a first popup window W1 notifying contents of the error. When the controller 180 receives an input Ia with respect to the first popup window W1, the controller 180 may display a second popup window W2 requesting re-authentication.

More specifically, when an error is generated during the payment process, the controller 180 may change a background screen of the payment card CP to a background screen BG" of a third state and inform the user of the payment error. Further, when the controller 180 receives the input Ia with respect to the first popup window W1, the controller 180 may display a second popup window W2 requesting the re-authentication and change a display of the background screen to a background screen BG of a first state.

Next, when the controller 180 receives an input Ib with respect to the second popup window W2, the controller 180 may be changed to a mode performing the re-authentication. When the controller 180 receives a fingerprint input Ic through the fingerprint recognition unit P1, the controller 180 may perform the re-authentication. When the re-authentication is completed, the controller 180 may produce a new token value using time information of a time point of the re-authentication and change a display of the background screen to a background screen BG' of a second state. Hence, the controller 180 may indicate that the valid token value is produced.

Figure 13:
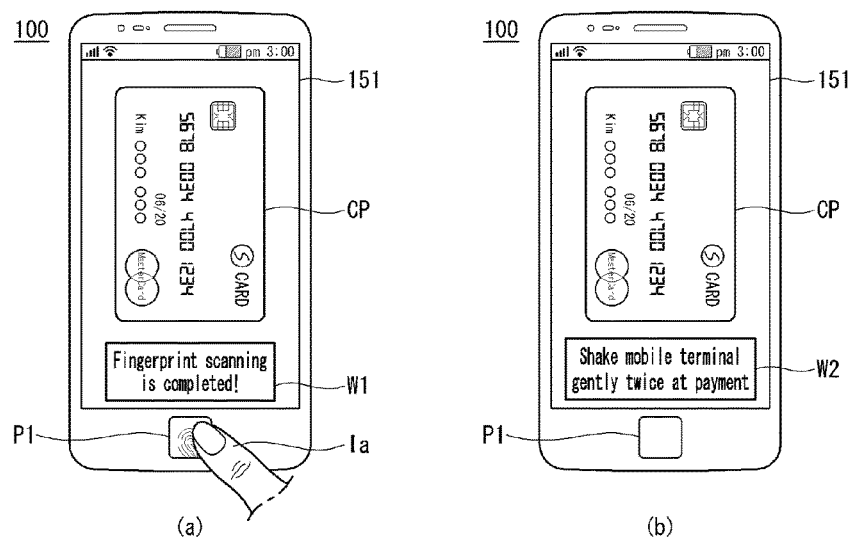
Figure 13:
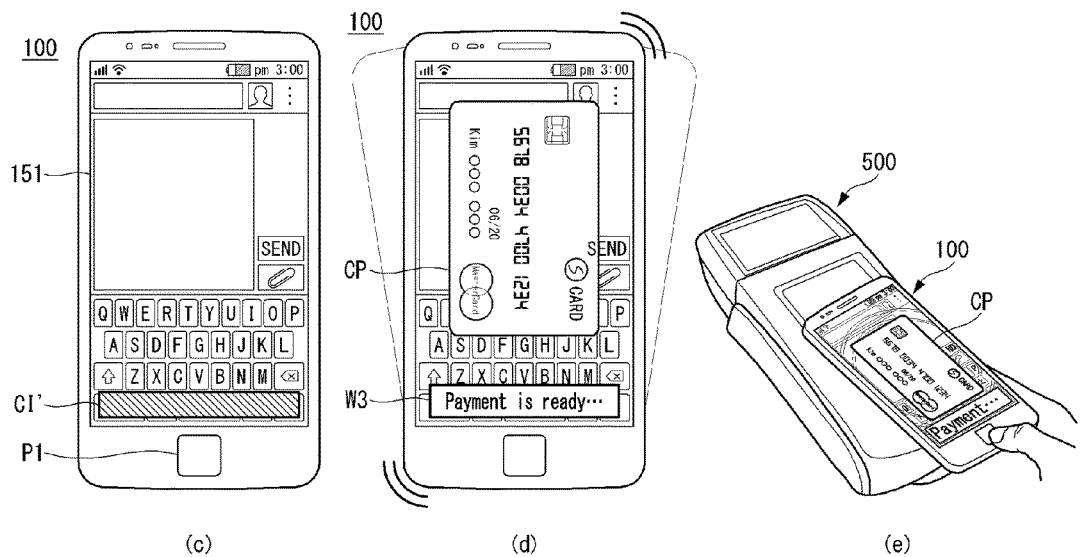

FIG. 13 illustrates a method for performing the payment after the authentication is completed in the mobile terminal according to the first embodiment of the invention.

Referring to FIG. 13, when the controller 180 of the mobile terminal receives a fingerprint input Ia through the fingerprint recognition unit P1, the controller 180 may process the fingerprint authentication. When the fingerprint authentication is completed, the controller 180 may display the first popup window W1 notifying a result of the fingerprint authentication.

When the fingerprint authentication is completed, the controller 180 may display the second popup window W2 notifying a guide of a specific motion for the payment. Afterwards, when the controller 180 senses the specific motion, the controller 180 may transmit the one-time payment information, the token value, to the affiliated store terminal 500. Namely, when the controller 180 senses the specific motion for performing the payment and then tags the mobile terminal 100 to the affiliated store terminal 500, the controller 180 may be set so that it transmits the token value.

More specifically, when the controller 180 executes a message application after the fingerprint authentication is completed and the token value is produced, the controller 180 may overlappingly display a specific indicator CI', which indicates that producing the token value is completed, on an execution screen of the message application. When the controller 180 receives a specific motion input while firstly executing the message application, the controller 180 may temporarily execute the specific application related to the payment first of all and perform the payment. In this instance, the controller 180 may maintain the display of the specific indicator CI' on the execution screen of the message application or change the display of the specific indicator CI' on the execution screen of the message application to a display of the payment card CP. Hence, the controller 180 may indicate that the payment is ready in the payment waiting state.

The controller 180 may maintain a state where the specific indicator CI' is displayed on the execution screen of the message application, tag the mobile terminal 100 to the affiliated store terminal 500, and transmit the token value to the affiliated store terminal 500 as a magnetic field signal. Alternatively, the controller 180 may temporarily display the payment card CP on the execution screen of the message application in the payment waiting state, tag the mobile terminal 100 to the affiliated store terminal 500, and transmit the token value to the affiliated store terminal 500 as the magnetic field signal. In this instance, the controller 180 may further display an indicator (e.g., a ring) indicating that the payment is being performed by transmitting the token value as the magnetic field signal to the affiliated store terminal 500.

Accordingly, the first embodiment of the invention may overlappingly display the payment card or the specific indicator corresponding to the payment card on a partial area of an execution screen of other application during the multitasking. Further, the first embodiment of the invention may temporarily change the execution of the specific application related to the payment to the foreground execution and perform the payment. Alternatively, the first embodiment of the invention may perform the payment without changing the execution of the specific application related to the payment to the foreground execution.

Figure 14:
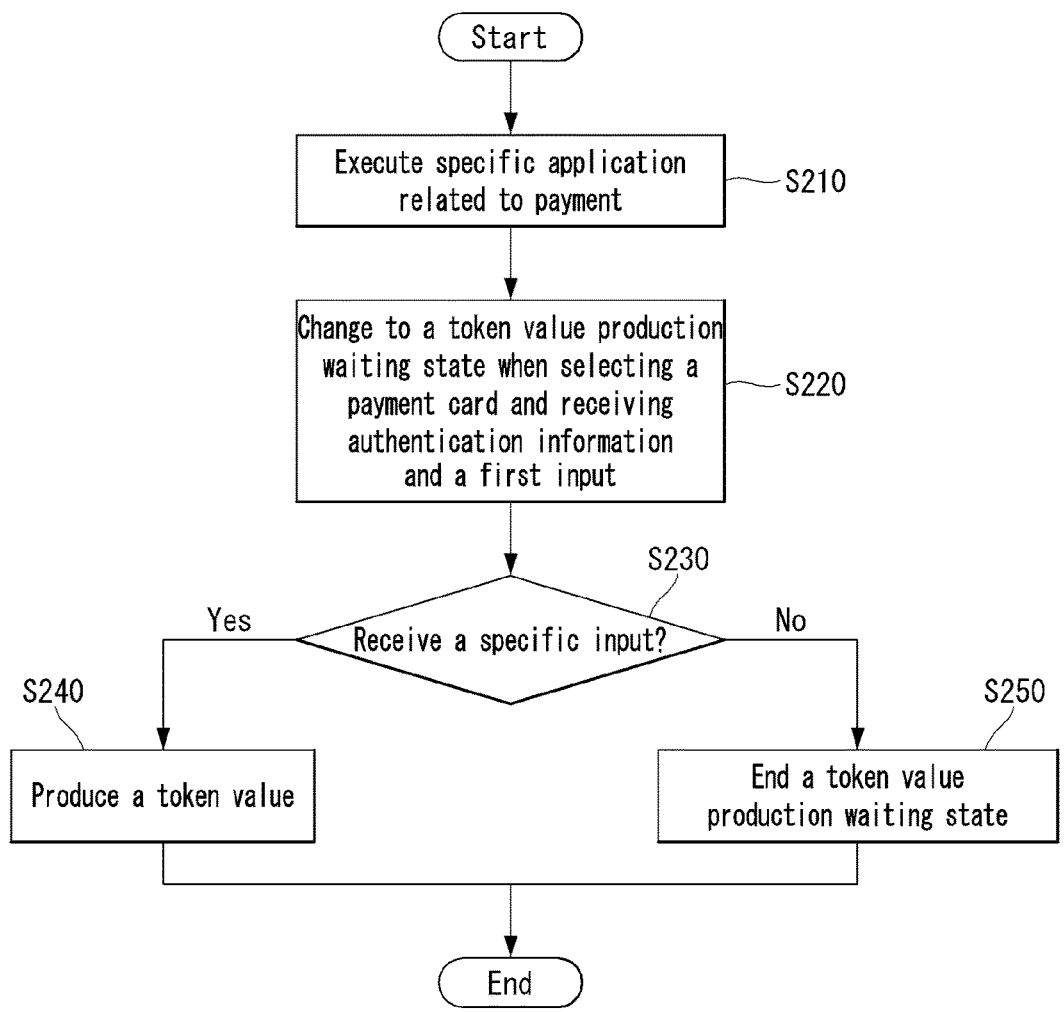
FIG. 14 is a flow chart showing a method for controlling a mobile terminal according to a second exemplary embodiment of the invention.

FIG. 14 is a flow chart showing a method for controlling a mobile terminal according to a second exemplary embodiment of the invention. FIGS. 15 to 23 illustrate a method for controlling a mobile terminal according to the second exemplary embodiment of the invention.

The second embodiment of the invention may differentiate a fingerprint input time point from a token value production time point and extend the token value production time point so that a token value is produced at a specific time point after a fingerprint input.

Referring to FIG. 14, the controller 180 of the mobile terminal may execute a specific application related to a payment in step S210. When the controller 180 selects a payment card among cards stored in the specific application and receives authentication information and a first input, the controller 180 may be changed to a token value production waiting state in step S220.

The controller 180 of the mobile terminal may determine whether or not a second input is input in the token value production waiting state in step S230. When the controller 180 receives the second input, the mobile terminal 100 may produce one-time payment information, i.e., a token value in step S240. When the controller 180 does not receive the second input, the controller 180 may end the token value production waiting state in step S250. In the embodiment disclosed herein, the first and second inputs in the second embodiment of the invention may be defined differently from the first and second inputs in the first embodiment of the invention.

More specifically, when the controller 180 receives a first touch input with respect to a fingerprint recognition unit, the controller 180 may determine it as the reception of the first input. The controller 180 may determine the release of a second touch input after receiving the second touch input with respect to the fingerprint recognition unit as the second input. Namely, when the second touch input with respect to the fingerprint recognition unit is released, the controller 180 may produce the one-time payment information, i.e., the token value and perform the payment.

When the controller 180 receives the first input with respect to the fingerprint recognition unit or the display unit 151 and then enters the display unit 151 in an inactive state, the controller 180 may obtain only the authentication information through the first input and may be changed to the token value production waiting state. Further, when the controller 180 receives the second input with respect to the fingerprint recognition unit in the inactive state of the display unit 151, the controller 180 may produce the token value. Namely, when the controller 180 changes the display unit 151 to the inactive state in a set period of time after receiving the first input with respect to the fingerprint recognition unit, the controller 180 may extend the token value production time point.

When the controller 180 produces the one-time payment information, i.e., the token value at a first time point and receives a third input through the fingerprint recognition unit at a second time point, at which the token value is valid (i.e., before a valid time of the token value is ended), the controller 180 may update the token value using time information of the second time point.

More specifically, when the controller 180 changes a display of the payment card or a display of a background screen of the payment card and a display of a specific indicator or a display of a background screen of the specific indicator based on the valid time of the token value and receives the third input before the valid time of the token value is ended, the controller 180 may update the token value so that the token value includes time information of a reception time point of the third input. In the embodiment disclosed herein, the third input may a drag input of a specific direction with respect to the fingerprint recognition unit. The controller 180 may display a guide with respect to the third input on the display unit 151.

When the controller 180 receives a fourth input through the fingerprint recognition unit or the display unit 151, the controller 180 may automatically produce the token value before the valid time of the token value is ended. In the embodiment disclosed herein, the fourth input may be an input of different fingerprints or an input of different passwords. More specifically, when the controller 180 obtains two or more different fingerprints through the fingerprint recognition unit and succeeds in fingerprint authentication, or when the controller 180 inputs two or more different passwords through the display unit 151 and succeeds in password authentication, the controller 180 may produce the one-time payment information, i.e., the token value and automatically update the token value before a valid time of the token value is ended.

Figure 15:
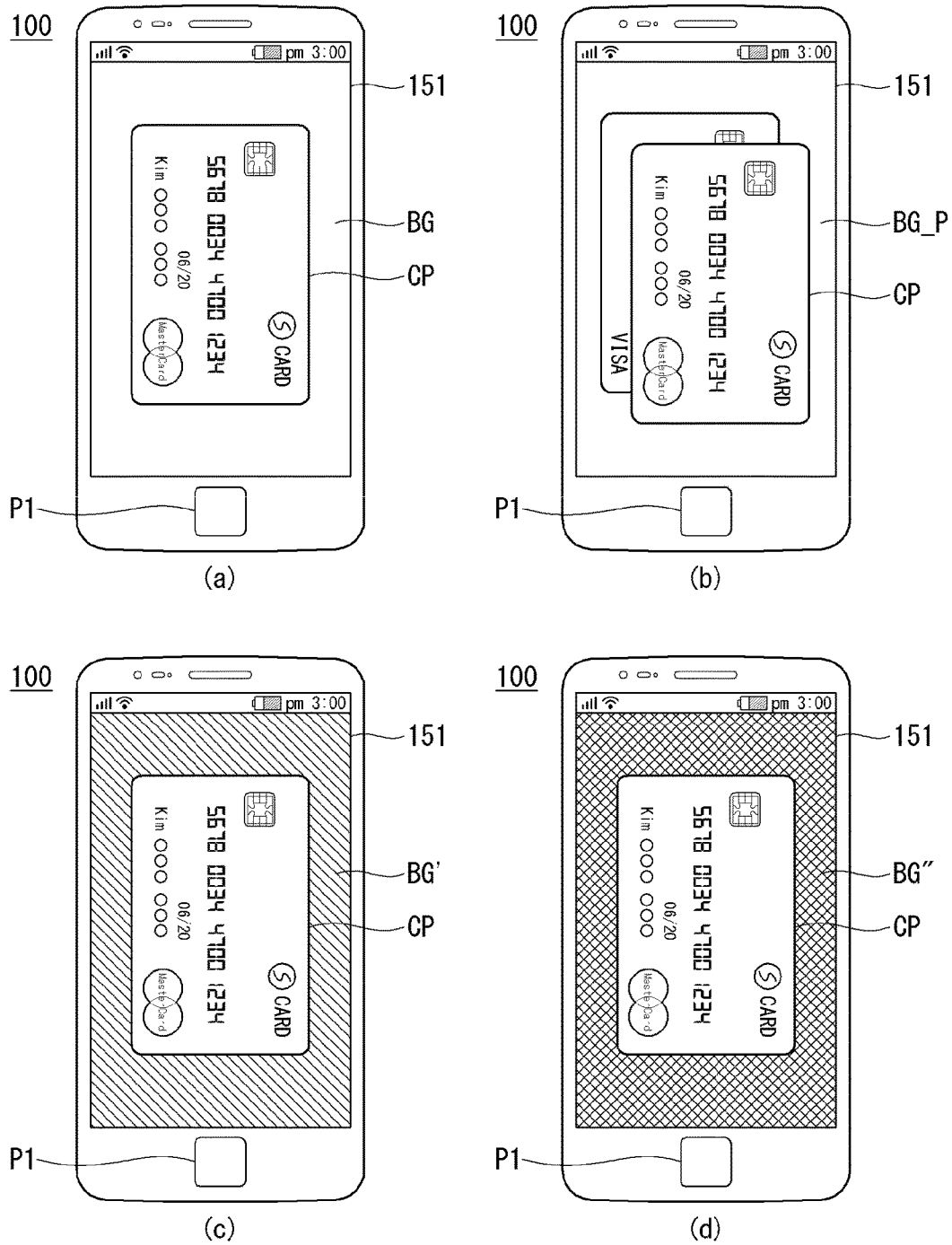
FIGS. 15 to 23 illustrate a method for controlling a mobile terminal according to a second exemplary embodiment of the invention.
Figure 16:
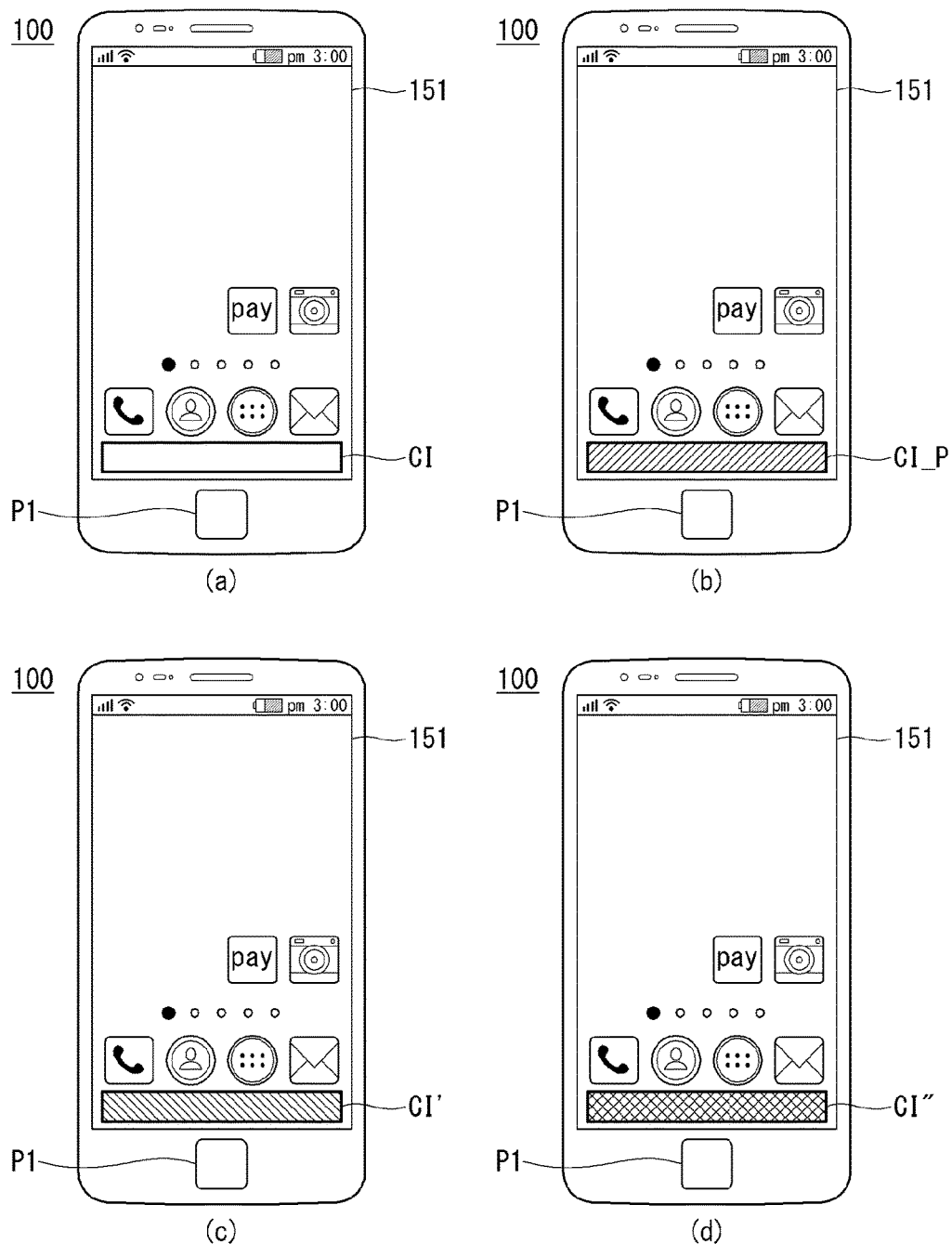

FIGS. 15 and 16 illustrate a method for displaying a background screen of a payment card or a specific indicator in accordance with payment stages in the mobile terminal according to the second embodiment of the invention.

Referring FIGS. 15 and 16, the controller 180 of the mobile terminal may display whether the mobile terminal 100 is in a payment ready state or a payment waiting state and whether or not the controller 180 is in the token production waiting state and also differently display a background screen of a payment card or a specific indicator depending on the valid time of the token value.

More specifically, as shown in (a) of FIG. 15 and (a) of FIG. 16, the controller 180 may display a payment card CP in a center area of the display unit 151 in the payment ready state and display a specific indicator CI in a first area of the display unit 151 in the payment waiting state. In the embodiment disclosed herein, the specific indicator CI may include a partial image of the payment card, a transparent image of the payment card, a fingerprint image, a text, or a specific icon, etc. The first area of the display unit 151 may be one area of the display unit 151.

As shown in (b) of FIG. 15 and (b) of FIG. 16, when only authentication information is input in the payment ready state or the payment waiting state, and a change to the token value production waiting state is performed, the controller 180 may change a background screen BG of the payment card CP to a background screen BGP of a first state or change the specific indicator CI to a first state CI_P.

As shown in (c) and (d) of FIG. 15, in the payment ready state and the token value production waiting state, the controller 180 may change the background screen BG of the payment card CP to a background screen BG' of a second state. When the valid time of the token value is close to its end time point, the controller 180 may change the background screen BG of the payment card CP to a background screen BG" of a third state. As shown in (c) and (d) of FIG. 16, in the payment waiting state and the token value production waiting state, the controller 180 may change the specific indicator CI to a second state CI'. When the valid time of the token value is close to its end time point, the controller 180 may change the specific indicator CI to a third state CI".

The controller 180 may indicate the states of the payment card CP and the specific indicator CI by changing a shape or a color of the background screen of the payment card CP or by changing a color of the specific indicator CI. The change in the display state of the background screen of the payment card or the change in the display state of the specific indicator in the mobile terminal according to the embodiment of the invention is merely an example. Thus, the embodiment of the invention may variously change the display state in accordance with the payment stages. Also, the display state of the background screen of the payment card or the display state of the specific indicator in the mobile terminal according to the embodiment of the invention may be variously changed.

FIGS. 17 to 20 illustrate a method for delaying a token value production time point in the mobile terminal according to the second embodiment of the invention.

Figure 17:
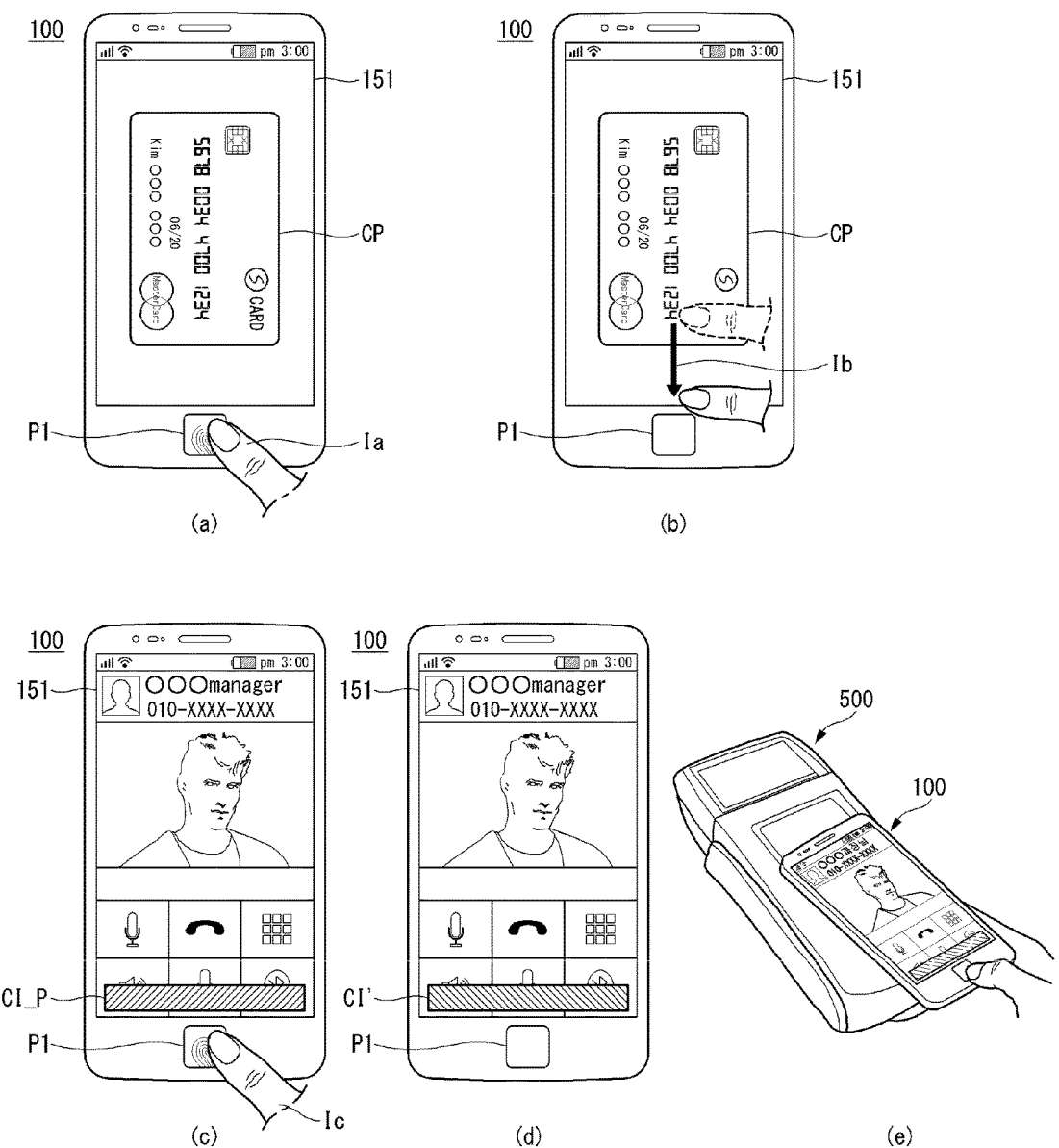

Referring to FIG. 17, when the controller 180 of the mobile terminal receives a fingerprint input Ia through the fingerprint recognition unit P1 in a state where the payment card CP is displayed on the display unit 151, and receives a drag input Ib with respect to the payment card CP for a set period of time, the controller 180 may extend the token value production time point.

More specifically, when the controller 180 receives the fingerprint input Ia with respect to the fingerprint recognition unit P1 and receives the input Ib for dragging the payment card CP in a downward direction of the display unit 151 for the set period of time, the controller 180 may change an operation mode of the mobile terminal to the token value production waiting state. When the controller 180 enters into the token value production waiting state, the controller 180 may change the payment card CP to the specific indicator CI_P of the first state and display it on the display unit 151.

When the controller 180 receives a fingerprint input Ic with respect to the fingerprint recognition unit P1 in a state where the specific indicator CI_P of the first state is displayed on the display unit 151, the controller 180 may produce the one-time payment information, i.e., the token value. Namely, when the controller 180 receives the first fingerprint input Ia and then receives the specific input Ib for the set period of time, the controller 180 may change the operation mode of the mobile terminal to the token value production waiting state and extend the token value production time point. In the embodiment disclosed herein, the set period of time is time required to produce the token value and may be previously set.

When the controller 180 receives the fingerprint input Ic with respect to the fingerprint recognition unit P1 in a state where the specific indicator CI_P of the first state is displayed on the display unit 151 and produces the token value, the controller 180 may change a display of the specific indicator CI_P of the first state to a display of the specific indicator CI' of the second state.

When the controller 180 tags the mobile terminal 100 to the affiliated store terminal 500 in a state where the specific indicator CI' of the second state is displayed, the controller 180 may transmit the token value to the affiliated store terminal 500 and request the payment.

Figure 18:
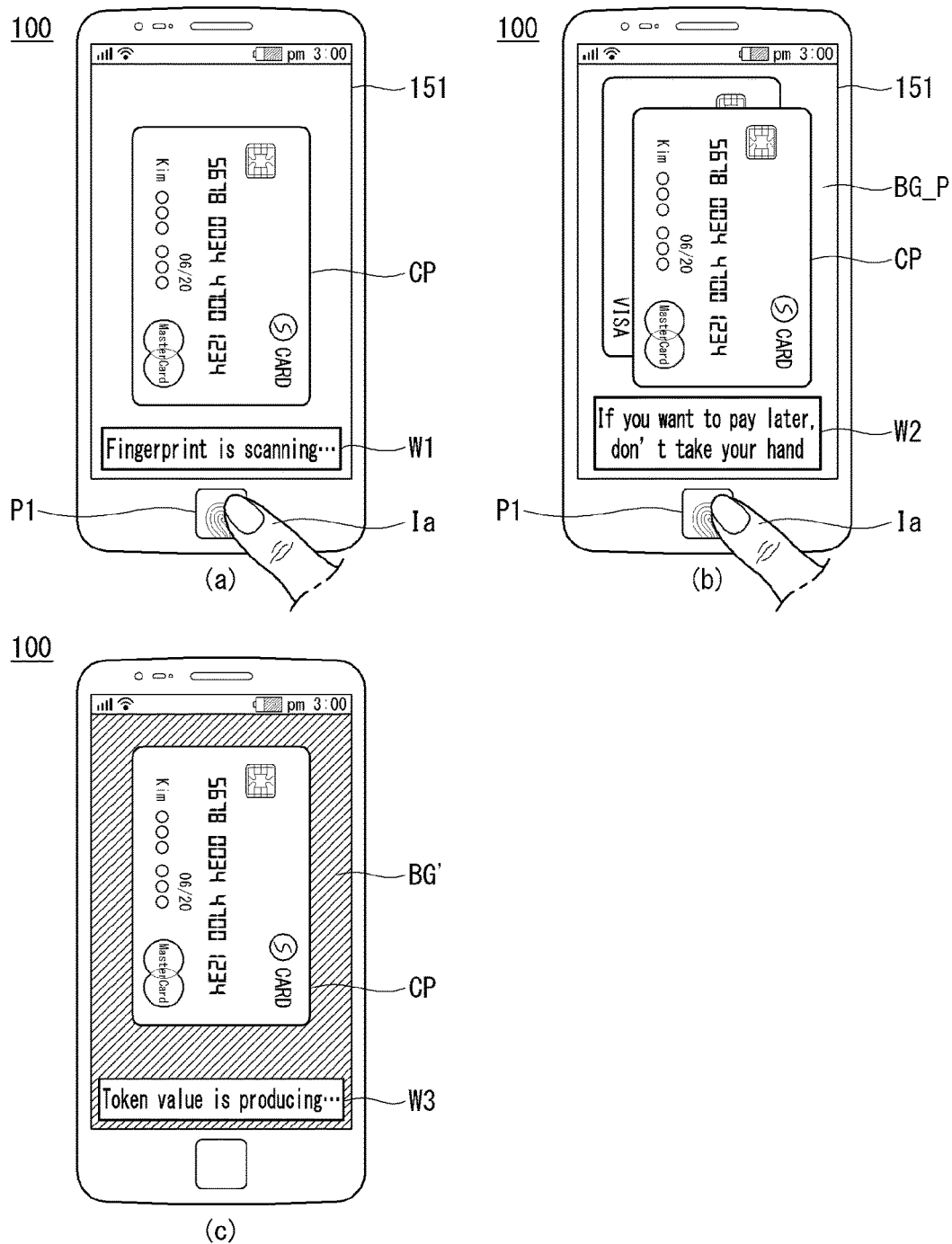
Figure 19:
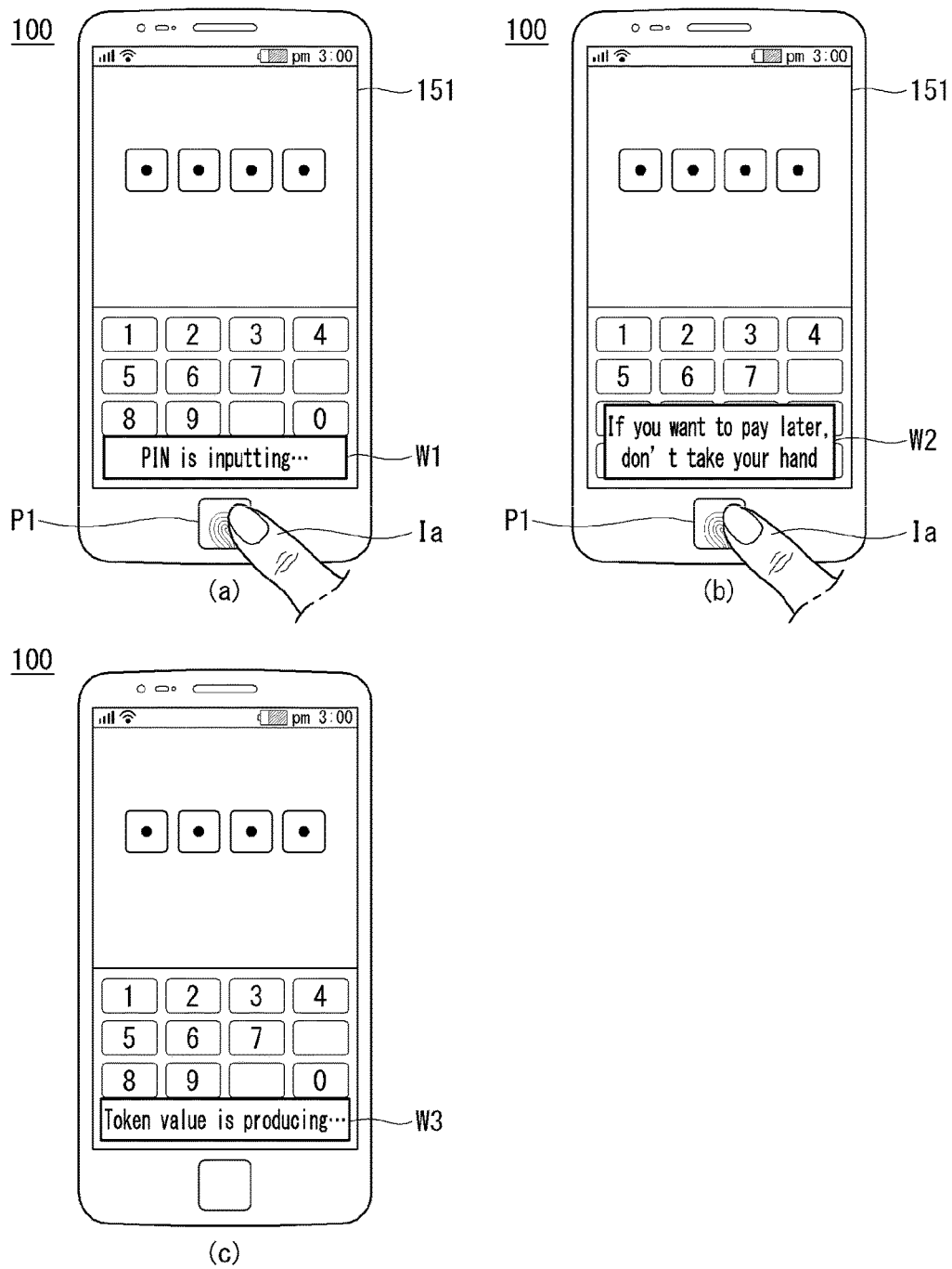

Referring to FIGS. 18 and 19, when the controller 180 of the mobile terminal receives an authentication information input Ia in a state where the payment card CP is displayed on the display unit 151, and the authentication information input Ia is maintained for a set period of time, the controller 180 may extend the token value production time point.

Referring to FIG. 18, when the fingerprint input Ia with respect to the fingerprint recognition unit P1 is maintained for a period of time equal to or longer than a set period of time, the controller 180 may be previously set so that the operation mode is changed to the token value production waiting state. When the controller 180 receives the fingerprint input Ia with respect to the fingerprint recognition unit P1, the controller 180 may display a first popup window W1 indicating that the fingerprint is scanning. When the fingerprint input Ia is maintained for the set period of time, the controller 180 may display a second popup window W2 notifying a guide of a user input for producing the token value. When the controller 180 receives a user input or an input release corresponding to contents of the second popup window W2, the controller 180 may produce the token value.

For example, when the controller 180 receives the fingerprint input Ia through the fingerprint recognition unit P1 for a period of time equal to or longer than a time t1, the controller 180 may be set so that the token value is produced when the fingerprint input Ia is released. When the controller 180 receives the fingerprint input Ia, the controller 180 may display the first and second popup windows W1 and W2 notifying a guide of the user input and produce the token value using time information of a release time point of the fingerprint input Ia when the fingerprint input Ia is released.

Referring to FIG. 19, when the controller 150 inputs a password through the display unit 151 and maintains the fingerprint input Ia through the fingerprint recognition unit P1 for a period of time equal to or longer than a set period of time, the controller 180 may be previously set so that the operation mode is changed to the token value production waiting state. When the controller 180 receives the fingerprint input Ia with respect to the fingerprint recognition unit P1, the controller 180 may display the first popup window W1 indicating that the fingerprint is scanning. When the fingerprint input Ia is maintained for the set period of time, the controller 180 may display the second popup window W2 notifying a guide of a user input for producing the token value. When the controller 180 receives a user input or an input release corresponding to contents of the second popup window W2, the controller 180 may produce the token value.

Figure 20:
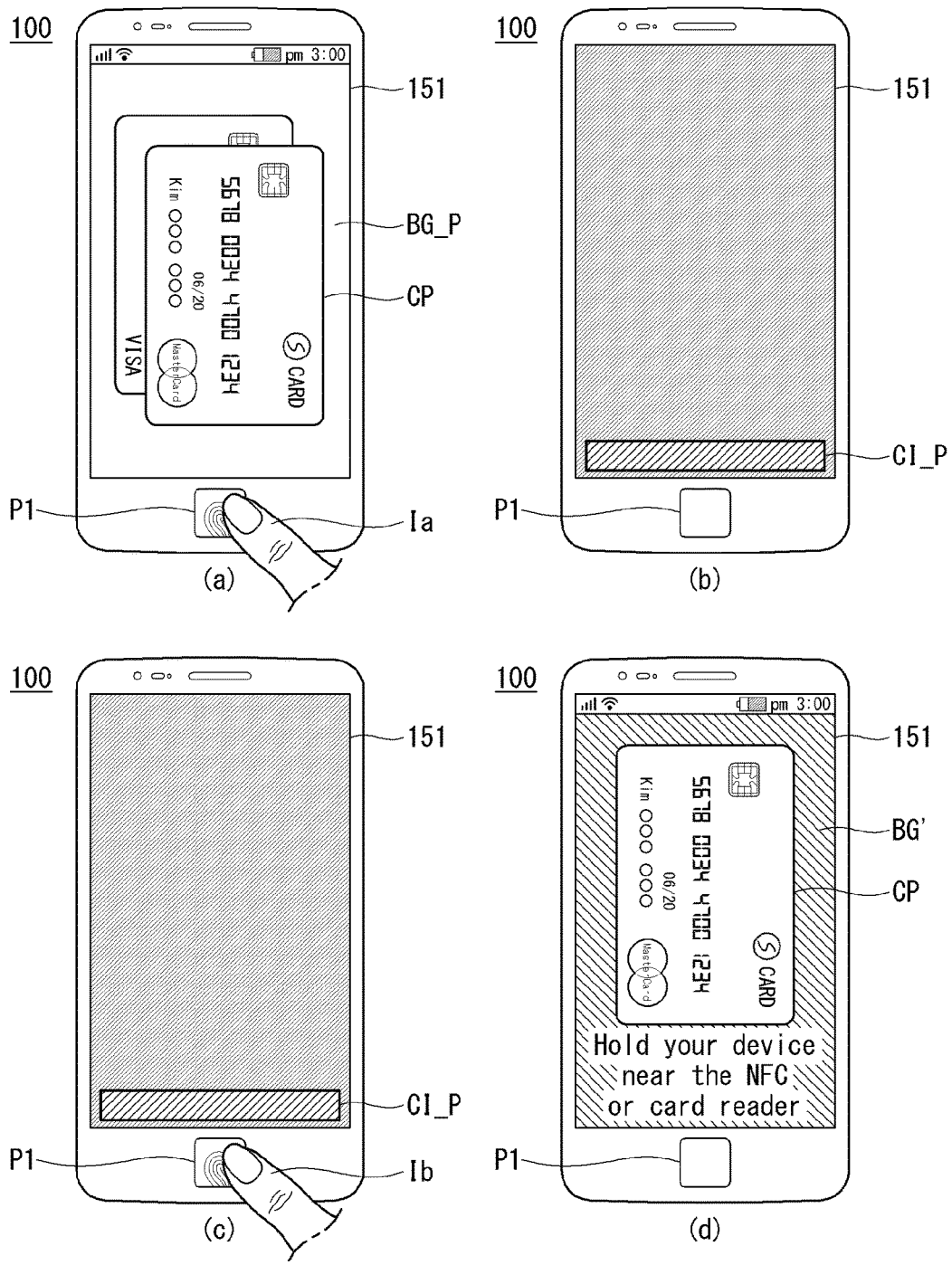

Referring to FIG. 20, when the controller 180 of the mobile terminal receives an authentication information input Ia in a state where the payment card CP is displayed on the display unit 151 and inactivates the display unit 151 in a set period of time, the controller 180 may extend the token value production time point. In the embodiment disclosed herein, the authentication information may be at least one of the fingerprint or the password.

When the controller 180 receives the fingerprint input Ia through the fingerprint recognition unit P1 in a state where the payment card CP is displayed in the center area of the display unit 151, the controller 180 may perform the authentication. When the controller 180 receives the fingerprint input Ia and then receives an input changing the display unit 151 to an inactive state in the set period of time, the controller 180 may perform only the authentication and stop producing the one-time payment information, i.e., the token value. In the embodiment disclosed herein, the input changing the display unit 151 to the inactive state may be at least one of an input displaying a lock screen on the display unit 151 or an input turning on the display unit 151.

When the production of the token value is stopped (i.e., when the operation mode of the mobile terminal is changed to a token value authentication waiting state), the controller 180 may display the specific indicator CI_P of the first state on the display unit 151. In this instance, the controller 180 may turn on only an area of the display unit 151 displaying the specific indicator CI_P of the first state and turn off other area of the display unit 151.

When the controller 180 receives a fingerprint input Ib through the fingerprint recognition unit P1 in the token value production waiting state, the controller 180 may produce the one-time payment information, i.e., the token value based on reception time of the fingerprint input Ib. When the token value is produced, the controller 180 may turn on the display unit 151 and display a guide bringing the mobile terminal into contact with the affiliated store terminal 500 on the display unit 151.

Figure 21:
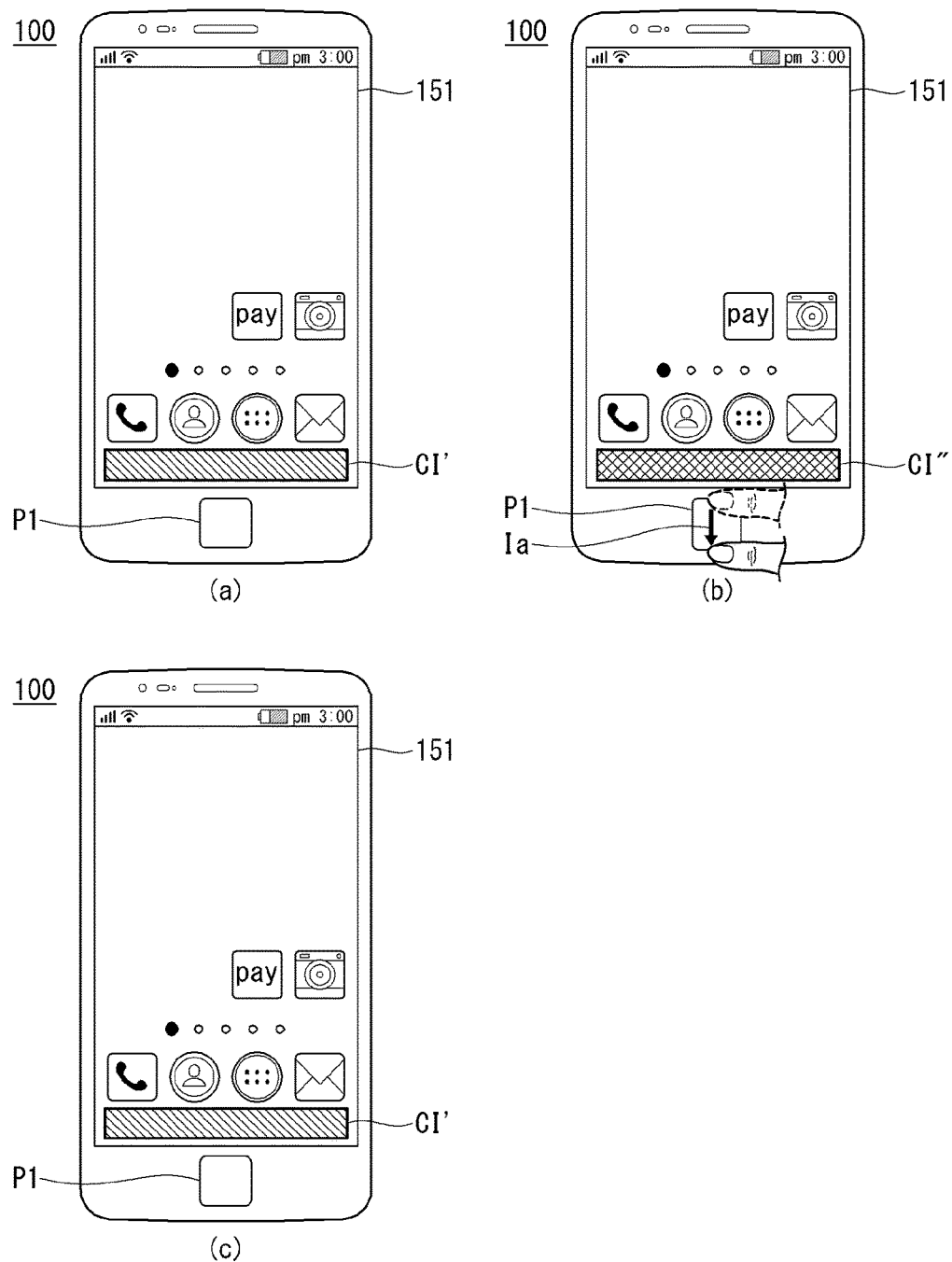
Figure 22:
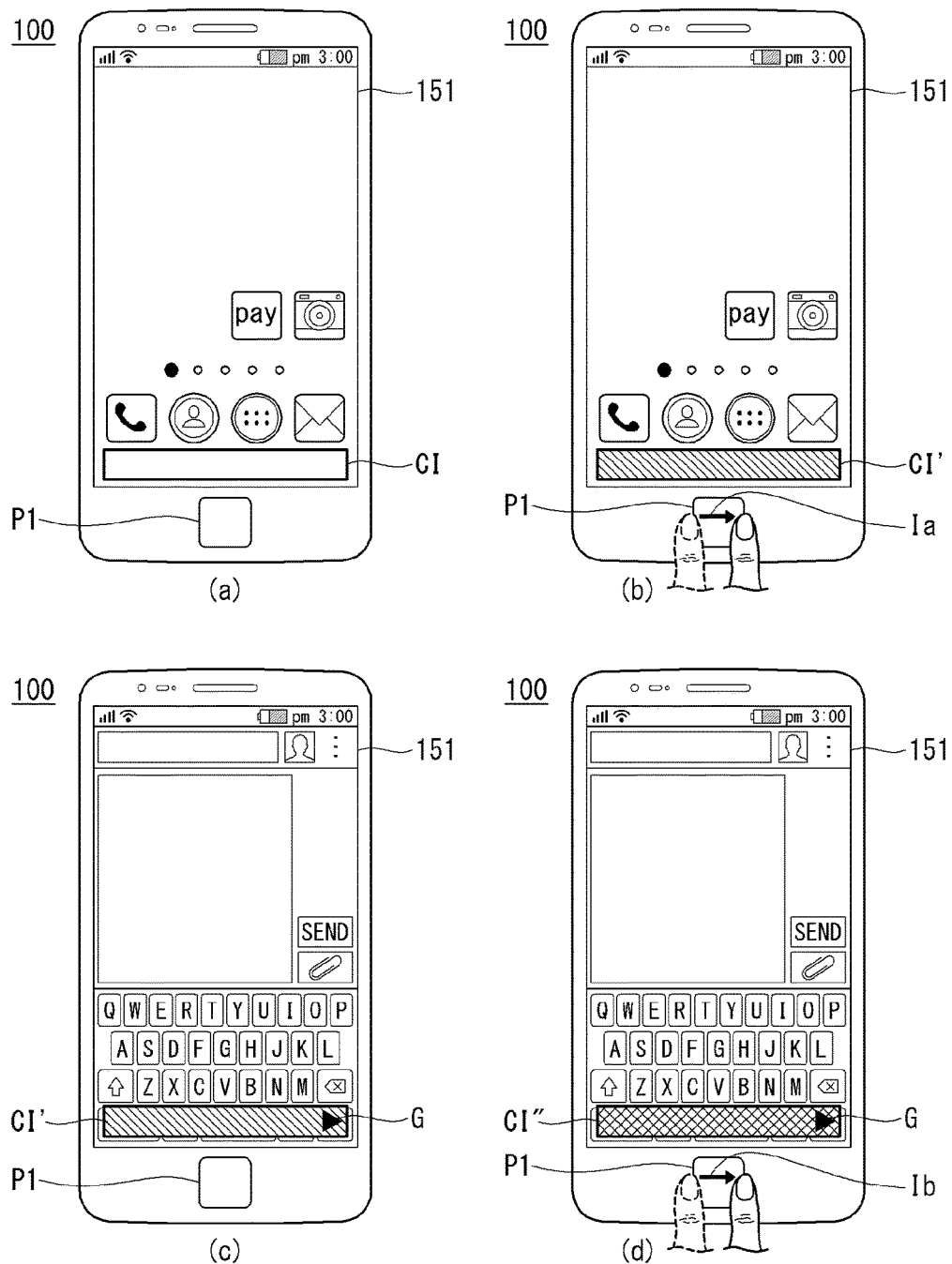
Figure 23:
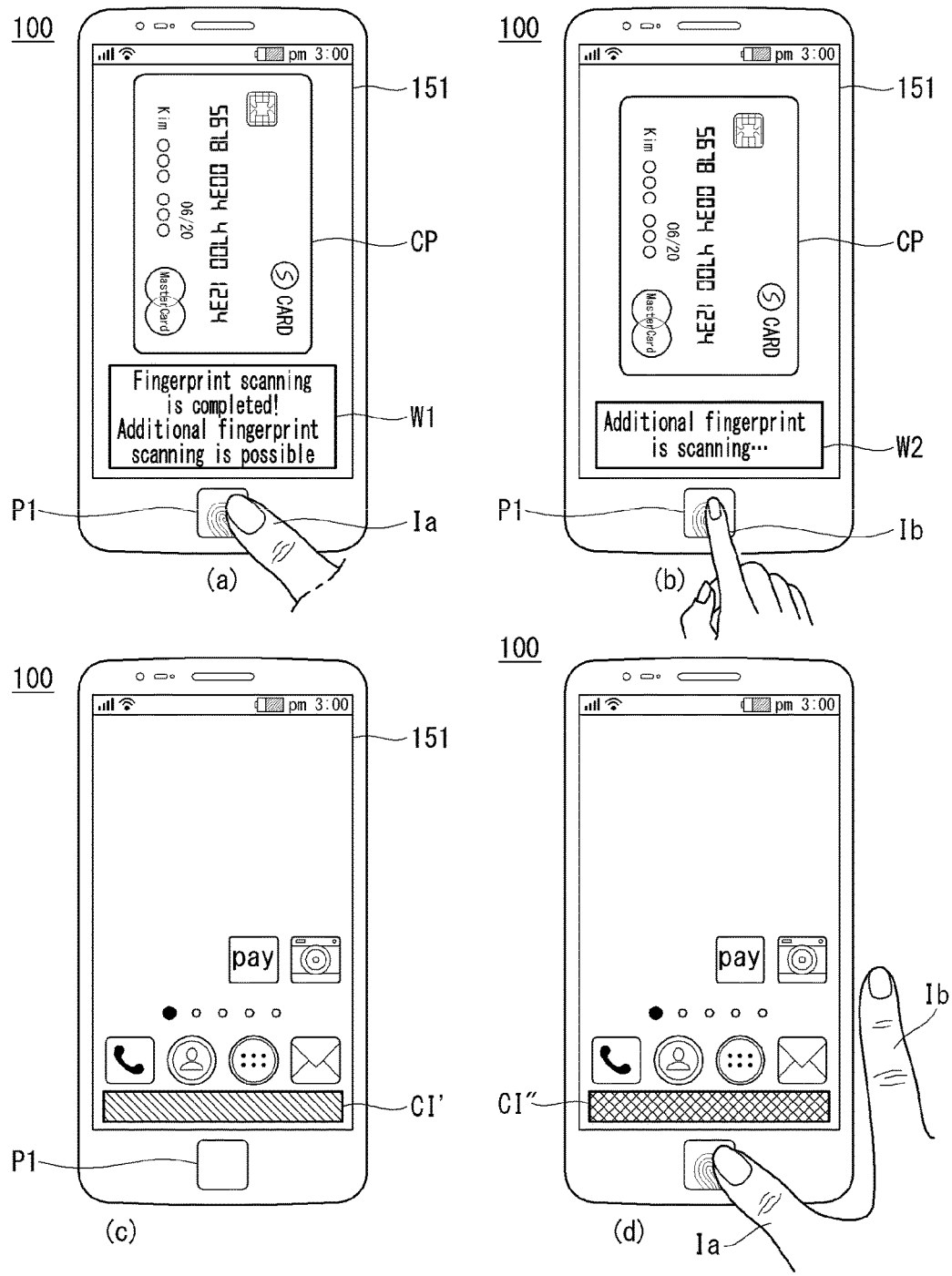

FIGS. 21 to 23 illustrate a method for updating the token value in the mobile terminal according to the second embodiment of the invention.

Referring to FIG. 21, when the token value is produced, the controller 180 of the mobile terminal may display the specific indicator CI' of the second state on the display unit 151. When the valid time of the token value is close to its end time point, the controller 180 may change a display of the specific indicator to the specific indicator CI" of the third state.

When the controller 180 receives a swipe input Ia with respect to the fingerprint recognition unit P1 in a state where the specific indicator CI" of the third state is displayed, the controller 180 may update the token value using time information of a reception time point of the swipe input Ia.

When the token value is updated, the controller 180 may change the specific indicator CI" of the third state to the specific indicator CI' of the second state.

Referring to FIG. 22, when the controller 180 of the mobile terminal receives an input of a specific direction with respect to the fingerprint recognition unit, the controller 180 may produce the token value. When the controller 180 receives an input of the same direction before the valid time of the token value is ended, the controller 180 may update the token value.

More specifically, as shown in (a) and (b) of FIG. 22, when the controller 180 displays the specific indicator CI in the payment ready state and receives a swipe input Ia of a specific direction through the fingerprint recognition unit P1, the controller 180 may produce the token value, change the specific indicator CI to the specific indicator CI' of the second state, and display the specific indicator CI' of the second state.

As shown in (c) of FIG. 22, when the controller 180 executes a message application, the controller 180 may display an execution screen of the message application on the display unit 151, display the specific indicator CI' of the second state, and display a guide indicator G guiding a specific direction on the specific indicator CI' of the second state.

When the valid time of the token value is close to its end time point, the controller 180 may change the specific indicator CI' of the second state to the specific indicator CI" of the third state and display the specific indicator CI" of the third state. As shown in (d) of FIG. 22, when the controller 180 receive a swipe input Ib with respect to the fingerprint recognition unit P1 corresponding to a guide direction G in a state where the specific indicator CI" of the third state is displayed, the controller 180 may update the token value using reception time information of the swipe input Ib.

As shown in (c) of FIG. 22, when the token value is updated, the controller 180 may again change the specific indicator CI" of the third state to the specific indicator CI' of the second state.

Referring to FIG. 23, when the controller 180 of the mobile terminal obtains two or more different fingerprints through the fingerprint recognition unit P1 and succeeds in fingerprint authentication or when the controller 180 inputs two or more different passwords through the display unit 151 and succeeds in password authentication, the controller 180 may produce the one-time payment information, the token value and automatically update the token value before the valid time of the token value is ended.

For example, as shown in (a) and (b) of FIG. 23, the controller 180 may receive a fingerprint input Ia of the thumb through the fingerprint recognition unit P1 in the payment ready state, sequentially receive a fingerprint input Ib of the index finger, and produce the token value.

As shown in (c) of FIG. 23, when the controller 200 produces the token value using two or more authentication informations, the controller 180 may display the specific indicator CI' of the second state as the specific indicator. When the valid time of the token value is close to its end time point, the controller 180 may change the specific indicator CI' of the second state to a display of the specific indicator CI" of the third state. When the controller 180 sequentially receives the fingerprint inputs Ia and Ib of the thumb and the index finger in a state where the specific indicator CI" of the third state is displayed, the controller 180 may automatically update the token value. Namely, when the valid time of the token value is close to its end time point, the controller 180 may automatically produce the token value of a new valid time.

Accordingly, the second embodiment of the invention may separate an authentication information obtainment time point from the token value production time point and may reduce token value production time using previously obtained authentication information. Hence, problem generated when the valid time of the token value is ended may be solved. Further, the second embodiment of the invention may inform the user that the valid time of the token value is close to its end time point before the valid time of the token value is ended and may update the previous token value to a token value having new time information. Therefore, the user can simply perform the payment processing while having more time in the payment processing.

The mobile terminal according to the embodiment of the invention may be implemented as a combination of the first and second embodiments of the invention. The controller of the mobile terminal according to the embodiment of the invention may control the operation mode as the payment ready state and the payment waiting state depending on the input and may delay the token value production time point. Further, the controller may automatically reproduce the token value or use the specific coupon or the specific point card along with the payment card.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a display; and
a controller configured to:
execute a specific application related to a payment, wherein a plurality of payment cards are associated with the specific application;
change the terminal to a payment ready state and cause the display to display a selected payment card of the plurality of payment cards; and
receive a specific input in the payment ready state;
determine whether the received specific input is a first input or a second input;

generate one-time payment information and a token value and perform the payment when the specific input is determined to be the first input; and change the terminal to a payment waiting state and cause the display to change the displayed payment card to a specific indicator when the specific input is determined to be the second input.

2. The mobile terminal of claim 1, further comprising a fingerprint recognition unit, wherein the first input comprises:

a recognized fingerprint input via the fingerprint recognition unit; or a successful password input via the display.

3. The mobile terminal of claim 1, wherein the controller is further configured to:

generate the one-time payment information and the token value using a reception time of the first input, identification information corresponding to the payment card, and an authentication seed of the payment card; and cause the token value to be transmitted to an affiliated store terminal.

4. The mobile terminal of claim 1, further comprising a fingerprint recognition unit, wherein the second input comprises an input dragging the displayed payment card in a specific direction of the display, a long touch input to the displayed payment card, or a touch or a swipe input to the fingerprint recognition unit.

5. The mobile terminal of claim 1, wherein:

authentication information is received at a first time point; and the controller is further configured to generate the token value at a second time point different from the first time point when a third input is received in the payment waiting state.

6. The mobile terminal of claim 1, wherein the controller is further configured to, when the second input is received in the payment ready state:

maintain the display of the specific indicator at a first area of the display; and cause all areas of the display to turn off other than the first area when the display is changed to an inactive state.

7. The mobile terminal of claim 1, wherein the controller is configured to, when the second input is received in the payment ready state, change the display of the specific indicator during the payment waiting state based on:

whether authentication information is input;

whether the one-time payment information is generated;

whether the token value is generated; or a valid time of the token value.

8. The mobile terminal of claim 1, wherein the controller is further configured to perform the payment or change an operation mode to the payment ready state and then perform the payment when the first input is received in the payment waiting state.

9. The mobile terminal of claim 1, wherein when the second input is received in the payment ready state, the specific indicator comprises at least a partial image of the payment card, a semi-transparent image of the payment card, a fingerprint image, or a text.

10. The mobile terminal of claim 1, further comprising a fingerprint recognition unit, wherein:

the first input comprises a release of a touch input to the fingerprint recognition unit; and the controller is further configured to generate the one-time payment information and the token value, and perform the payment when the touch input of the first input is released.

11. The mobile terminal of claim 1, further comprising a fingerprint recognition unit, wherein:

the one-time payment information and the token value are generated at a first time point;

the controller is further configured to update the token value at a second time point when a third input is received via the fingerprint recognition unit;

the second time point is before an expiration of a valid time of the token value; and the token value is updated using time information of the second time point.

12. The mobile terminal of claim 11, wherein the controller is further configured to cause the display to display a guide related to the third input.

13. The mobile terminal of claim 1, further comprising a fingerprint recognition unit, wherein the controller is further configured to generate the one-time payment information and the token value and update the token value before an expiration of a valid time of the token value in response to:

two or more different recognized fingerprints input via the fingerprint recognition unit; or two or more different successful passwords input via the display.

14. The mobile terminal of claim 1, wherein the controller is further configured to:

cause the display to display one or more secondary payment options when a third input is received during the payment ready state; and cause the display to display a selected secondary payment option to overlap the displayed payment card.

15. The mobile terminal of claim 14, wherein the controller is further configured to perform the payment using the selected secondary payment option along with the displayed payment card.

16. A mobile terminal comprising:

a display;

a fingerprint recognition unit; and a controller configured to:

execute a specific application related to a payment;

select a payment card of a plurality of payment cards stored in association with the specific application;

change the terminal to a token value waiting state when authentication information and a first input via the display or the fingerprint recognition unit is received; and generate one-time payment information and a token value when a second input is received during the token value waiting state, wherein the controller is further configured to update the token value when a third input is received at a particular time point via the fingerprint recognition unit; and the token value is updated using time information of the particular time point and the particular time point is before an expiration of a valid time of the token value.

17. The mobile terminal of claim 16, wherein the token value is updated before the expiration of the valid time of the token value when the third input is received.

18. A method for controlling a mobile terminal comprising:

executing a specific application related to a payment;

changing the terminal to a payment ready state and displaying a payment card when the payment card is selected from a plurality of payment cards stored in the specific application; and receiving a specific input in the payment ready state;

determining whether the received specific input is a first input or a second input;

generating one-time payment information and a token value to perform the payment when the specific input is determined to be the first input; and changing the terminal to a payment waiting state and changing the displayed payment card to a specific indicator when the specific input is determined to be the second input.

19. A method for controlling a mobile terminal comprising:

executing a specific application related to a payment;

changing the terminal to a token value waiting state when a payment card of a plurality of payment cards stored in the specific application is selected and authentication information and a first input is received;

generating one-time payment information and a token value when a second input is received during the token value waiting state; and updating the token value when a third input is received at a particular time point via a fingerprint recognition unit of the mobile terminal, wherein the token value is updated using time information of the particular time point and the particular time point is before an expiration of a valid time of the token value.

* * * * *